(12) United States Patent
Kojima

(10) Patent No.: US 11,666,898 B2
(45) Date of Patent: Jun. 6, 2023

(54) CERAMIC HONEYCOMB STRUCTURE AND HONEYCOMB-MOLDING DIE

(71) Applicant: PROTERIAL, LTD., Tokyo (JP)

(72) Inventor: Shinya Kojima, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/262,947

(22) PCT Filed: Aug. 28, 2019

(86) PCT No.: PCT/JP2019/033692
§ 371 (c)(1),
(2) Date: Jan. 25, 2021

(87) PCT Pub. No.: WO2020/045492
PCT Pub. Date: Mar. 5, 2020

(65) Prior Publication Data
US 2021/0308662 A1    Oct. 7, 2021

(30) Foreign Application Priority Data

Aug. 30, 2018   (JP) ............................ JP2018-161194

(51) Int. Cl.
*B01J 35/04*   (2006.01)
*B28B 3/26*    (2006.01)
(Continued)

(52) U.S. Cl.
CPC ............ *B01J 35/04* (2013.01); *B01D 53/885* (2013.01); *B01J 37/0009* (2013.01);
(Continued)

(58) Field of Classification Search
None
See application file for complete search history.

(56) References Cited

U.S. PATENT DOCUMENTS

2004/0142145 A1   7/2004   Hashimoto et al.
2012/0251768 A1*  10/2012  Sendo ............... C04B 35/185
                                              428/116

FOREIGN PATENT DOCUMENTS

JP    09-299731 A     11/1997
JP    2003-010616 A   1/2003
(Continued)

OTHER PUBLICATIONS

Machine translation of Konno JP 2016-172223 A translated by JPO on Jan. 20, 2022 (Year: 2016).*

(Continued)

*Primary Examiner* — Elizabeth Collister
(74) *Attorney, Agent, or Firm* — Sughrue Mion, PLLC

(57) ABSTRACT

A ceramic honeycomb structure comprising large numbers of flow paths longitudinally formed by cell walls arranged in a lattice pattern in cross section, and an outer peripheral wall formed around the flow paths; in a cross section perpendicular to the longitudinal direction, fan-shaped bulges projecting in a fan shape toward the flow paths from cell wall intersections at which the cell walls are crossing; the circumscribed circles of circular portions of the fan-shaped bulges at all cell wall intersections having a constant radius; and when the distance between the center point of the circumscribed circle and the center point of the cell wall intersection is defined as a center point distance S, a center point distance So in the outer peripheral portion of the ceramic honeycomb structure and a center point distance Sc in the center portion meeting Sc<So.

5 Claims, 13 Drawing Sheets

(51) Int. Cl.
  *C04B 38/00* (2006.01)
  *B01D 53/88* (2006.01)
  *B01J 37/00* (2006.01)
(52) U.S. Cl.
  CPC .......... *B28B 3/269* (2013.01); *C04B 38/0009* (2013.01); *B01D 2255/9202* (2013.01)

(56) References Cited

FOREIGN PATENT DOCUMENTS

| | | |
|---|---|---|
| JP | 2014-046601 A | 3/2014 |
| JP | 2016-172223 A | 9/2016 |

OTHER PUBLICATIONS

International Search Report for PCT/JP2019/033692 dated Dec. 3, 2019.

\* cited by examiner

CERAMIC HONEYCOMB STRUCTURE AND HONEYCOMB-MOLDING DIE

CROSS-REFERENCE TO RELATED APPLICATIONS

This application is a National Stage of International Application No. PCT/JP2019/033692 filed Aug. 28, 2019, which claims priority to Japanese Patent Application No. 2018-161194 filed on Aug. 30, 2018.

FIELD OF THE INVENTION

The present invention relates to a ceramic honeycomb structure and a honeycomb-molding die.

BACKGROUND OF THE INVENTION

Ceramic honeycomb structures are used for catalyst carriers and filters in exhaust gas-cleaning apparatuses for internal engines. As shown in FIG. 15, a ceramic honeycomb structure 60 comprises an outer peripheral wall 61, and large numbers of flow paths 63 partitioned by porous cell walls 62 inside the outer peripheral wall 61. Such ceramic honeycomb structure can be obtained by extrusion-molding a moldable ceramic material having plasticity by a known die to form a honeycomb green body integrally having an outer peripheral portion and cell walls, cutting, drying and sintering it, removing the outer peripheral portion by machining, and then coating the exposed outer peripheral surface with a coating material to form an outer peripheral wall.

Particularly for catalyst carriers and filters for diesel engines of large vehicles and special vehicles, for example, large ceramic honeycomb structures of 190 mm or more in outer diameter and 200 mm or more in length, and ceramic honeycomb structures having as thin walls as 0.15 mm or less are used. Because such large ceramic honeycomb structures and thin-wall ceramic honeycomb structures are subjected to a large load by mechanical vibration and impact during use, it is demanded to improve their mechanical strength.

JP 2016-172223 A discloses a honeycomb structure comprising a honeycomb structure body having cell walls partitioning pluralities of cells and intersection portions of the cell walls, each of particular cells among the above cells having a polygonal shape with pluralities of convexly or concavely curved corners in a cross section perpendicular to the longitudinal direction of the cells, at least one corner being concavely curved, and the concavely curved corners being 1.5% or more of all cell corners in the honeycomb structure body. JP 2016-172223 A describes that such structure makes the honeycomb structure resistant to cracking even in the operation of burning soot, and suppresses the propagation of cracks, if generated, while suppressing increase in pressure loss.

However, when the structure described in JP 2016-172223 A is used for large ceramic honeycomb structures of 190 mm or more in outer diameter and 200 mm or more in length, and ceramic honeycomb structures having as thin walls as 0.15 mm or less, sufficient strength is not obtained particularly in their outer peripheral portions, and thus further improvement in strength is desired.

JP 09-299731 A discloses an exhaust gas filter comprising a honeycomb column comprising ceramic lattice walls constituting quadrangle cells, the ceramic walls being thicker near ceramic wall intersections than in other portions, and the ceramic walls having substantially circular cross sections at intersections. JP 09-299731 A also discloses that one of methods for making ceramic walls thicker near intersections than in other portions is to form holes at slit intersections of an extrusion-molding die by drilling. JP 09-299731 A describes that such structure can prevent ceramic walls near intersections from being cracked by thermal stress during the generation of the exhaust gas filter.

However, when the structure described in JP 09-299731 A is used for large ceramic honeycomb structures of 190 mm or more in outer diameter and 200 mm or more in length, and ceramic honeycomb structures having as thin walls as 0.15 mm or less, their strength may not be sufficient particularly to shock to the outer peripheral walls in handling, etc., so that further improvement of strength is desired.

JP 2014-46601 A discloses a ceramic honeycomb structure comprising pluralities of flow paths partitioned by porous ceramic cell walls, each flow path being provided with corners R having a radius of curvature in a range of 0.01-0.8 mm in a cross section of the ceramic honeycomb structure perpendicular to the flow path direction, and the corners R in three regions comprising a first region including the center, a second region outside the first region, and a third region including an outer peripheral portion outside the second region, having larger average radii of curvature as getting distant from the center axis toward the outer peripheral portion. JP 2014-46601 A describes that in the production of this ceramic honeycomb structure by extrusion molding using a die having corners R in accordance with the corners R in the first to third regions, the non-uniformity of an extrusion rate is suppressed by adjustment to make extrusion molding resistance smaller as getting distant from the center portion toward the outer peripheral portion, resulting in less deformation in extrusion molding, and providing the ceramic honeycomb structure with higher mechanical strength because the corners R have larger radii of curvature in the outer peripheral portion.

However, when the die described in JP 2014-46601 A is used to extrusion-mold large ceramic honeycomb structures of 190 mm or more in outer diameter and 200 mm or more in length, and ceramic honeycomb structures having as thin walls as 0.15 mm or less, the resultant ceramic honeycomb structures may have insufficient mechanical strength, so that further improvement in strength is desired.

OBJECT OF THE INVENTION

Accordingly, an object of the present invention is to provide a ceramic honeycomb structure having sufficient mechanical strength, for example, even though it is as large as 190 mm or more in outer diameter and 200 mm or more in length, and/or has as thin cell walls as 0.15 mm or less, and a honeycomb-molding die for producing such a ceramic honeycomb structure.

SUMMARY OF THE INVENTION

As a result of intensive research in view of the above object, the inventors have paid attention to the shape of cell wall intersections in a ceramic honeycomb structure having large numbers of flow paths partitioned by cell walls, finding a structure of providing a ceramic honeycomb structure with improved strength in its outer peripheral portion. The present invention has been completed based on such finding.

Thus, the ceramic honeycomb structure of the present invention has large numbers of flow paths longitudinally formed by cell walls arranged in a lattice pattern in cross section, and an outer peripheral wall formed around the flow paths;

at least one fan-shaped bulge being projecting in a fan shape toward the flow paths from a cell wall intersection at which the cell walls are crossing, in a cross section perpendicular to the longitudinal direction;

circumscribed circles of circular portions of the fan-shaped bulges at all cell wall intersections having a constant radius; and when the distance between the center point of the circumscribed circle and the center point of the cell wall intersection is defined as a center point distance S, a center point distance So in an outer peripheral portion of the ceramic honeycomb structure and a center point distance Sc in a center portion of the ceramic honeycomb structure meeting Sc<So.

In the outer peripheral portion of the ceramic honeycomb structure, the center point of the circumscribed circle is preferably positioned on the side of the outer peripheral wall of the ceramic honeycomb structure with respect to the center point of the cell wall intersection.

The center point distance Sc in the center portion of the ceramic honeycomb structure is preferably 20 μm or less, with the difference between the center point distance So in the outer peripheral portion and the center point distance Sc in the center portion being 5-150 μm.

A center point distance Sh of the cell wall intersection in an intermediate portion between the center and outer peripheral portions of the ceramic honeycomb structure preferably meets Sc<Sh<So.

The radius of the circumscribed circle is preferably 0.75-1.25 times the thickness of the cell walls of the ceramic honeycomb structure.

The honeycomb-molding die of the present invention comprises supply holes for supplying a moldable material, and lattice-shaped slits for molding the moldable material to a honeycomb shape, which are formed on the opposite surface side to a surface side on which the supply holes are formed, with communication with the supply holes;

four corners of a die member at a slit intersection at which the lattice-shaped slits are crossing having circular recesses when viewed in the extrusion direction;

the inscribed circles of the four circular recesses at all slit intersections having a constant radius; and when the distance between the center point of the inscribed circle and the center point of the slit intersection is defined as a die center point distance Sd, a die center point distance Sdc in a center portion of the honeycomb-molding die and a die center point distance Sdo in an outer peripheral portion of the honeycomb-molding die meeting Sdc<Sdo.

In the outer peripheral portion of the die, the center point of the inscribed circle is preferably positioned on the outer periphery side of the honeycomb-molding die with respect to the center point of the slit intersection.

In the honeycomb-molding die, the die center point distance Sdh at the slit intersection in an intermediate portion between the center and outer peripheral portions of the die preferably meets Sdc<Sdh<Sdo.

Effects of the Invention

The present invention capable of producing ceramic honeycomb structures having sufficient mechanical strength is particularly suitable for as large ceramic honeycomb structures as 190 mm or more in outer diameter and 200 mm or more in length, and ceramic honeycomb structures having as thin cell walls as 0.15 mm or less. It can also provide a honeycomb-molding die for producing a ceramic honeycomb structure having sufficient mechanical strength.

BRIEF DESCRIPTION OF THE DRAWINGS

FIG. 10b is a cross-sectional view taken along the line P-P in FIG. 10a.

FIG. 11 is a schematic view enlargedly showing slit intersections at positions A, B, D and E in FIG. 10a.

FIG. 12 is photomicrographs showing slit intersections at positions A, J, I, D and E in FIG. 10a.

DESCRIPTION OF THE PREFERRED EMBODIMENTS

The embodiments of the present invention will be specifically explained below without intention of restricting the present invention thereto. It should be noted that within the scope of the present invention, design modifications, improvements, etc. may be properly added based on the usual knowledge of those skilled in the art.

[1] Ceramic Honeycomb Structure

Figure 1A:
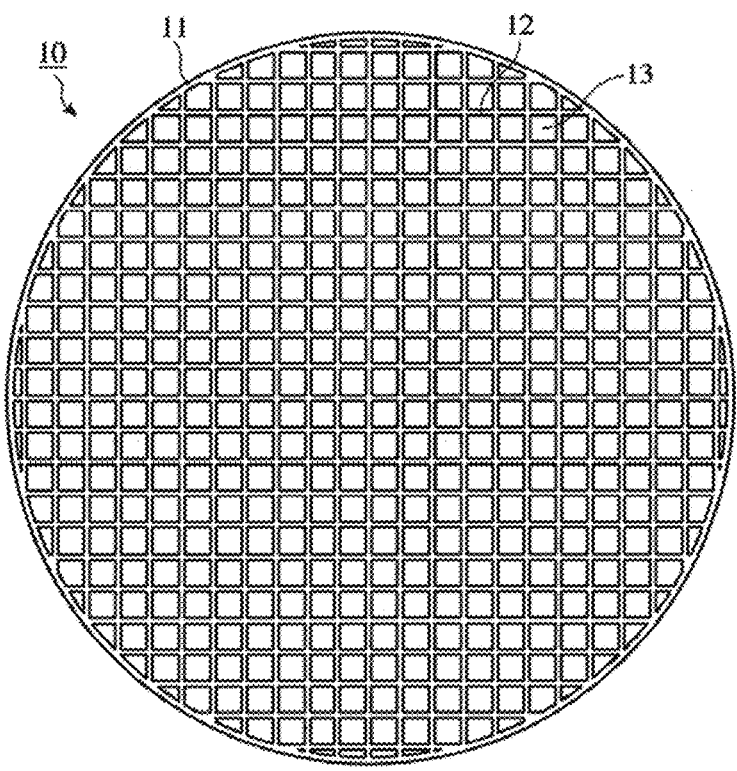
FIG. 1a is a front view schematically showing an example of the ceramic honeycomb structures of the present invention.
Figure 1B:
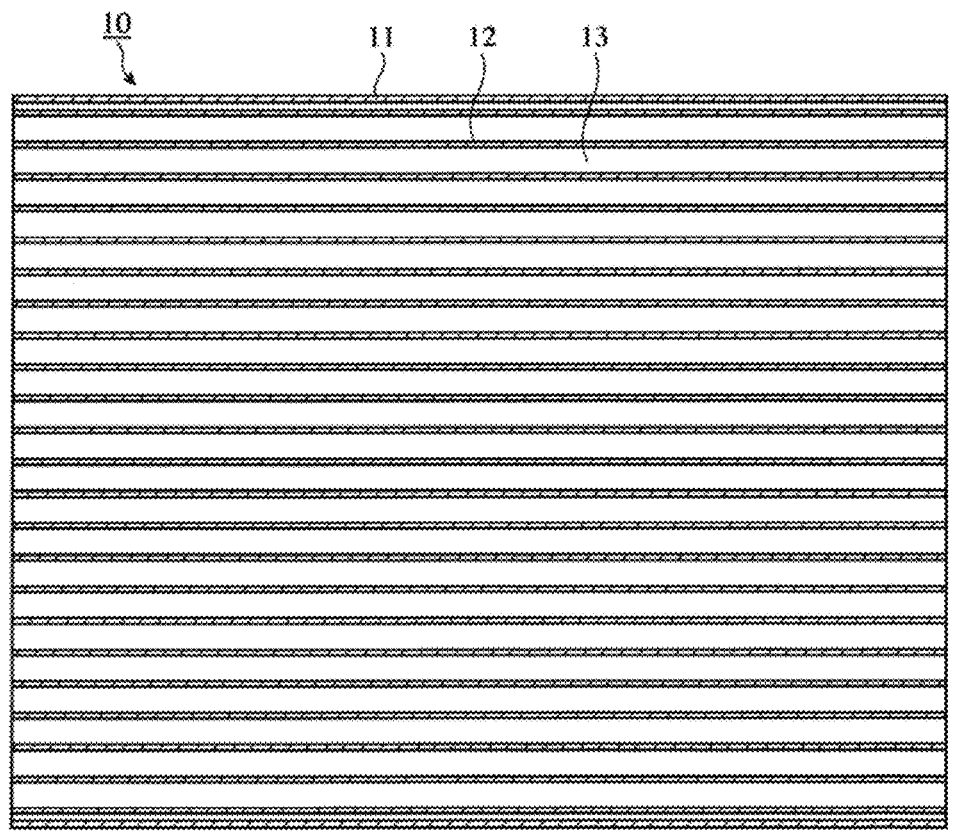
FIG. 1b is a cross-sectional view schematically showing an example of the ceramic honeycomb structures of the present invention in parallel with its longitudinal direction.
Figure 2:
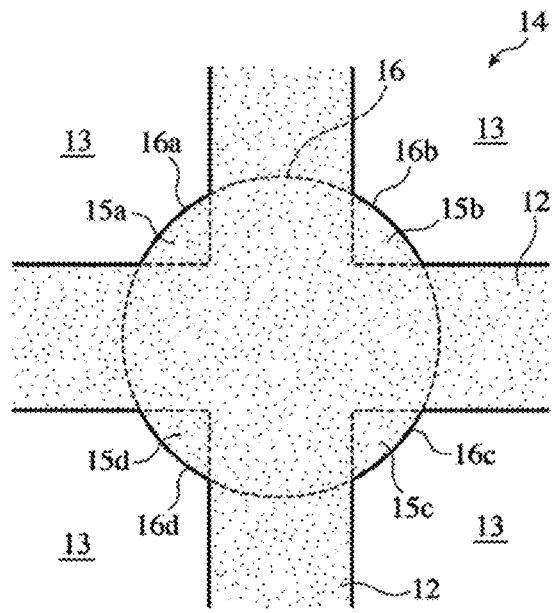
FIG. 2 is a cross-sectional view schematically showing fan-shaped bulges formed at a cell wall intersection, in a cross section of the ceramic honeycomb structure of the present invention.
Figure 3:
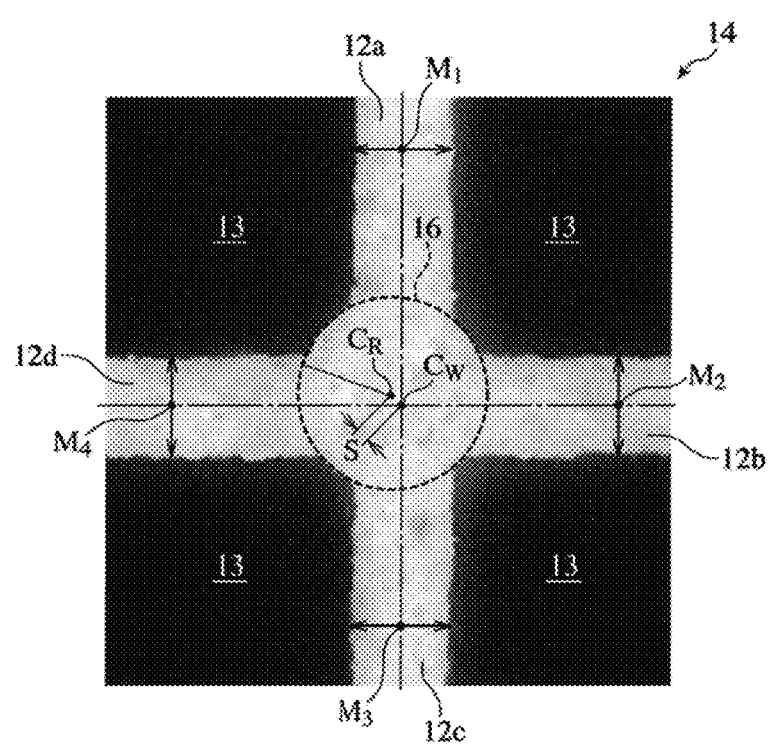
FIG. 3 is a schematic view for explaining the positional relation between the center point of fan-shaped bulges and the center point of a cell wall intersection, in a cross section of the ceramic honeycomb structure of the present invention.

As shown in FIGS. 1a and 1b, the ceramic honeycomb structure 10 of the present invention comprises large numbers of longitudinally extending flow paths 13 partitioned by cell walls 12 having a lattice-shaped cross section, and an outer peripheral wall 11 formed around the flow paths. In a cross section perpendicular to the longitudinal direction, as shown in FIG. 2, a cell wall intersection 14 at which the cell walls 12 are crossing has fan-shaped bulges 15a, 15b, 15c, 15d projecting in a fan shape toward the flow paths 13, and the circumscribed circles 16 of circular portions 16a, 16b, 16c, 16d of the fan-shaped bulges 15a, 15b, 15c, 15d at all cell wall intersections 14 have a constant radius. As shown in FIG. 3, when the distance between the center point $C_R$ of the circumscribed circle 16 and the center point $C_W$ of the cell wall intersection 14 is defined as a center point distance S, a center point distance So in an outer peripheral portion and a center point distance Sc in a center portion in the ceramic honeycomb structure 10 meet Sc<So.

Figure 4:
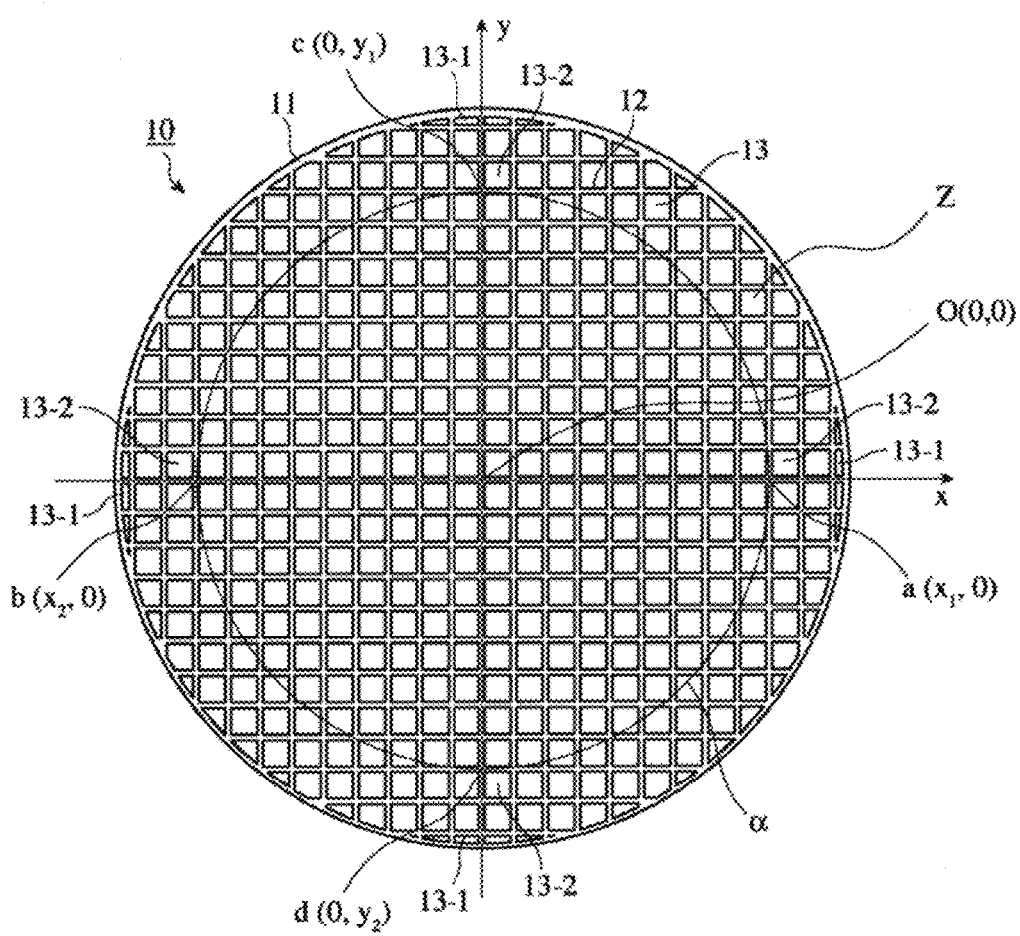
FIG. 4 is a cross section view for explaining an outer peripheral portion of the ceramic honeycomb structure of the present invention.

In a cross section perpendicular to the longitudinal direction, as shown in FIG. 4, an x-axis and a y-axis are defined as extending along the cell walls with the axis center O of the honeycomb structure as an origin, and flow paths 13-2 (four in total) counted second except for the outermost incomplete flow paths 13-1 from an intersection of each axis and the outer peripheral surface toward the origin are selected. Lengths from the origin to four intersections (two on the x-axis, and two on the y-axis) of the centerlines of inside (origin-side) cell walls of the four second flow paths 13-2 and the axes (x-axis and y-axis) are averaged to obtain an average value r, thereby depicting a circle α having a radius r. The outer peripheral portion of the ceramic honeycomb structure is defined as a region Z with the origin as a center outside the circle α (on the side of the outer peripheral surface). With the coordinates of intersections of the cell walls and the axes being a $(x_1, 0)$, b $(x_2, 0)$, c $(0, y_1)$, and d $(0, y_2)$, wherein $x_1>x_2$, and $y_1>y_2$, the radius r can be calculated by $r=(x_1-x_2+y_1-y_2)/4$.

The center point distance So in the outer peripheral portion is obtained by selecting four cell wall intersections in the outer peripheral portion as described below, defining four groups each having three cell wall intersections in total including one selected cell wall intersection and two adjacent cell wall intersections, determining an average value Say of their center point distances S in each group, and averaging them over the above four groups. Four cell wall intersections in the outer peripheral portion honeycomb structure are selected at two positions in a direction along the cell wall (x-axis or y-axis) from the axis center O (hereinafter referred to as "direction of 90°"), and at two positions in a direction along the cell wall intersections (diagonal lines of flow paths) (hereinafter referred to as "direction of 45°").

Also, two cell wall intersections adjacent to the selected cell wall intersection are defined as those perpendicularly adjacent to an axis along the cell wall from the center O when they are selected in a direction of the cell wall (direction of 90°), and those on the closer side to the center O along the cell wall intersections when they are selected in a direction of the cell wall intersections (direction of 45°).

The center point distance Sc in the center portion is defined as an average of center point distances in five cell wall intersections in total including the closest cell wall intersection to the center of the ceramic honeycomb structure, and four cell wall intersections adjacent thereto.

The center point $C_R$ of the circumscribed circle 16 is a center determined from circular portions 16a, 16b, 16c, 16d of fan-shaped bulges 15a, 15b, 15c, 15d at one cell wall intersection 14, and the center point $C_W$ of the cell wall intersection 14 is an intersection of centerlines of two cell walls 12 crossing at one cell wall intersection 14. Specifically, in cell walls 12a, 12b, 12c, 12d extending in four directions from a cell wall intersection 14 as a center, as shown in FIG. 3, middle points M1, M2, M3 and M4 are determined in the thickness directions of the cell walls, a line connecting the middle points M1 and M3 and a line connecting the middle points M2 and M4 are drawn, and their intersection is regarded as the center point $C_W$ $(X_W, Y_W)$ of the cell wall intersection 14, wherein $(X_W, Y_W)$ are the coordinates of the center point $C_W$. Incidentally, each middle point M1, M2, M3, M4 is determined at a middle of the cell wall intersection 14 and its adjacent cell wall intersection. In one cell wall intersection 14, a center of a circumscribed circle 16 in contact with the contours of circular portions 16a, 16b, 16c, 16d of four fan-shaped bulges 15a, 15b, 15c, 15d is regarded as the center point $C_R$ $(X_R, Y_R)$ of the circumscribed circle 16, wherein $(X_R, Y_R)$ represents the coordinates of the center point $C_R$. In some cell wall intersections 14, only three or two fan-shaped bulges may be clearly projecting toward the flow paths 13. In that case, a circumscribed circle 16 is drawn from the circular portions of three or two fan-shaped bulges, and its center is determined as the center point $C_R$ $(X_R, Y_R)$ of the circumscribed circle 16.

The words that the circumscribed circles 16 at all cell wall intersections 14 have a constant radius mean that their radii are equal within a range of variation which may occur in the production. Though ceramic honeycomb structures are designed such that the circumscribed circles of circular portions of fan-shaped bulges have a constant radius, slight deformation may occur in cell walls and fan-shaped bulges produced, resulting in varied radii of the circumscribed circles from position to position. Accordingly, in the present invention, the radii of the circumscribed circles are regarded as equal as long as they are within this range of variation. The variation range of the radii of the circumscribed circles is within ±5%.

With circumscribed circles 16 of the circular portions 16a, 16b, 16c, 16d of the fan-shaped bulges 15a, 15b, 15c, 15d at all cell wall intersections 14 having a constant radius, the total area of fan-shaped bulges 15a, 15b, 15c, 15d in the center portion is substantially the same as the total area of fan-shaped bulges 15a, 15b, 15c, 15d in the outer peripheral portion in a radial cross section, the amount of a moldable material supplied to an extrusion-molding die comprising supply holes for supplying a moldable material and lattice-shaped slits communicating with the supply holes does not substantially differ between the center portion and the outer peripheral portion during extrusion molding, avoiding the generation of molding strain between the center portion and the outer peripheral portion, and thus suppressing cracking in sintering.

The center point distance S is a distance between the center point $C_W$ and the center point $C_R$, which is determined by $S=[(X_W-X_R)^2+(Y_W-Y_R)^2]^{1/2}$. The coordinates $(X_W, Y_W)$ of the center point $C_W$ and the coordinates $(X_R, Y_R)$ of the center point $C_R$ may be determined with an arbitrary point, for example, the center point of the ceramic honeycomb structure 10, as an origin. These center points $C_W$ and $C_R$ can be determined by measuring a cross section of the ceramic honeycomb structure 10, for example, by an image analyzer (Quick Vision available from Mitutoyo Corporation).

Figure 5:
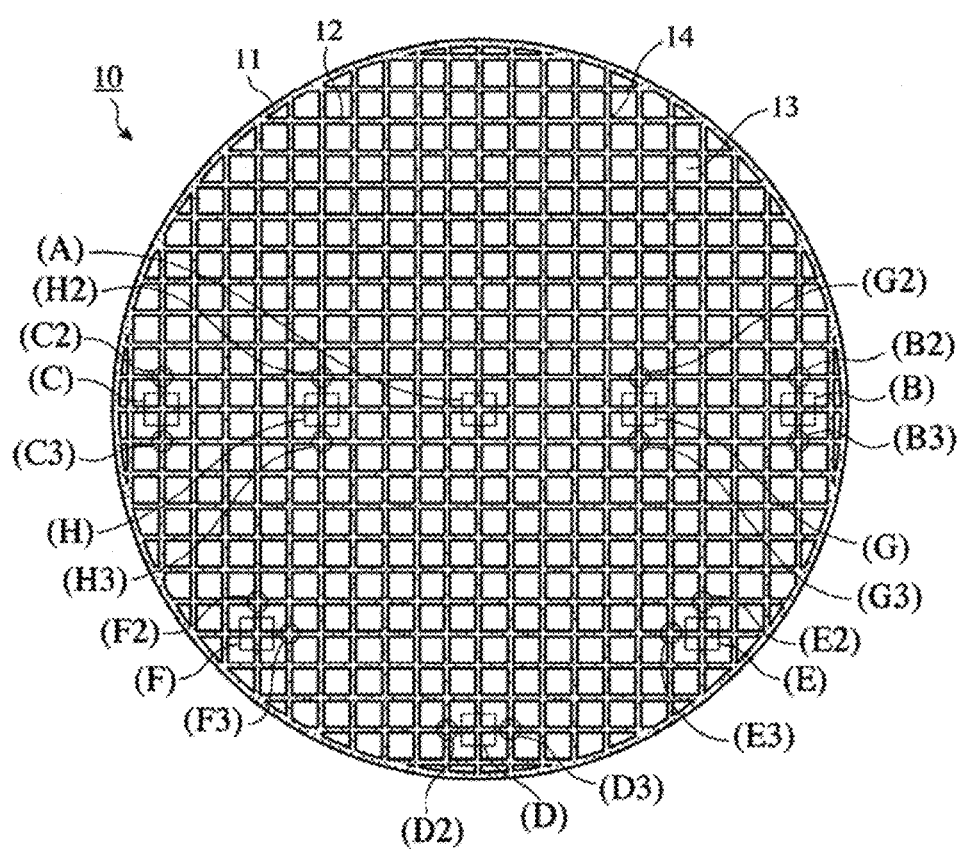
FIG. 5 is a cross-sectional view showing an example of the ceramic honeycomb structures of the present invention.
Figure 6:
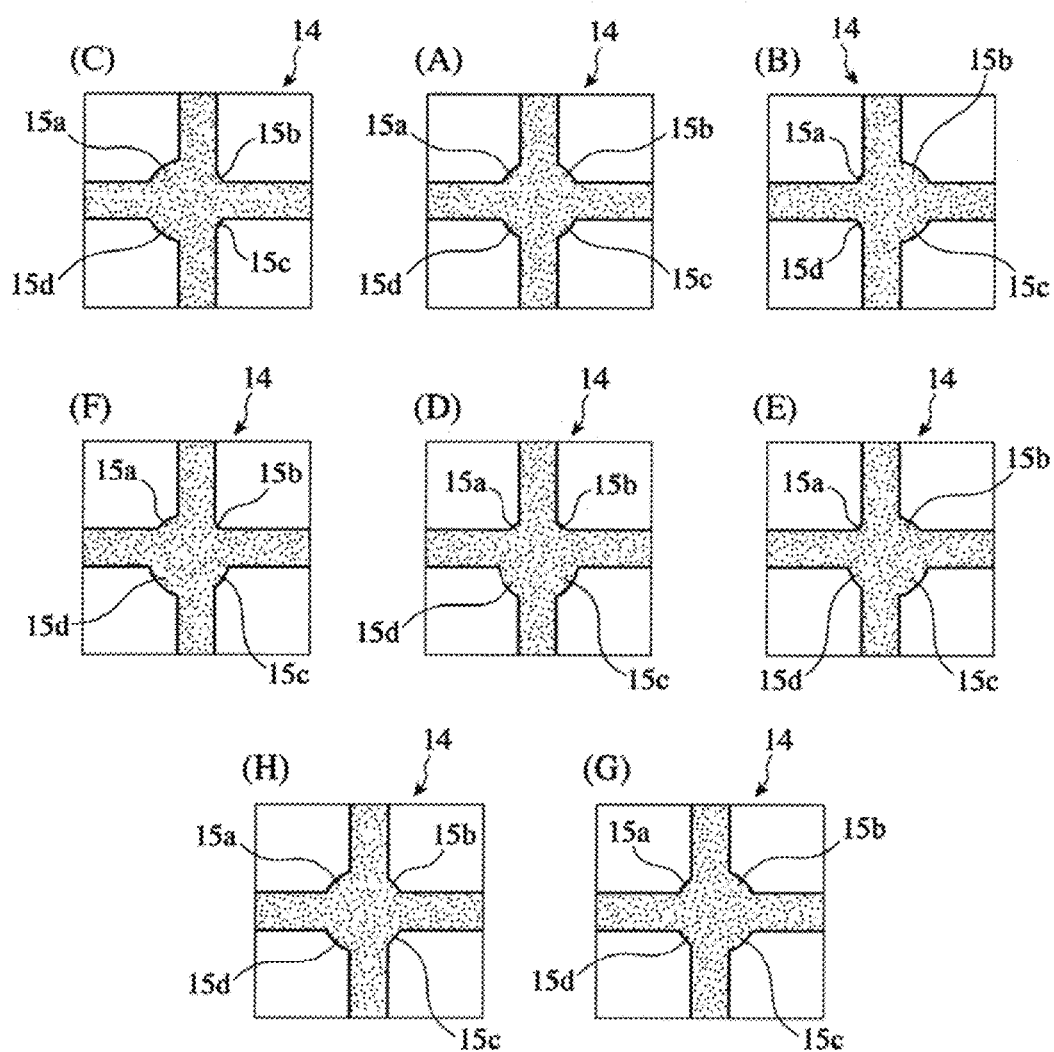
FIG. 6 is a schematic view enlargedly showing cell wall intersections in a center portion (A), intermediate portions (G) and (H), and outer peripheral portions (B) to (F) in FIG. 5.
Figure 7:
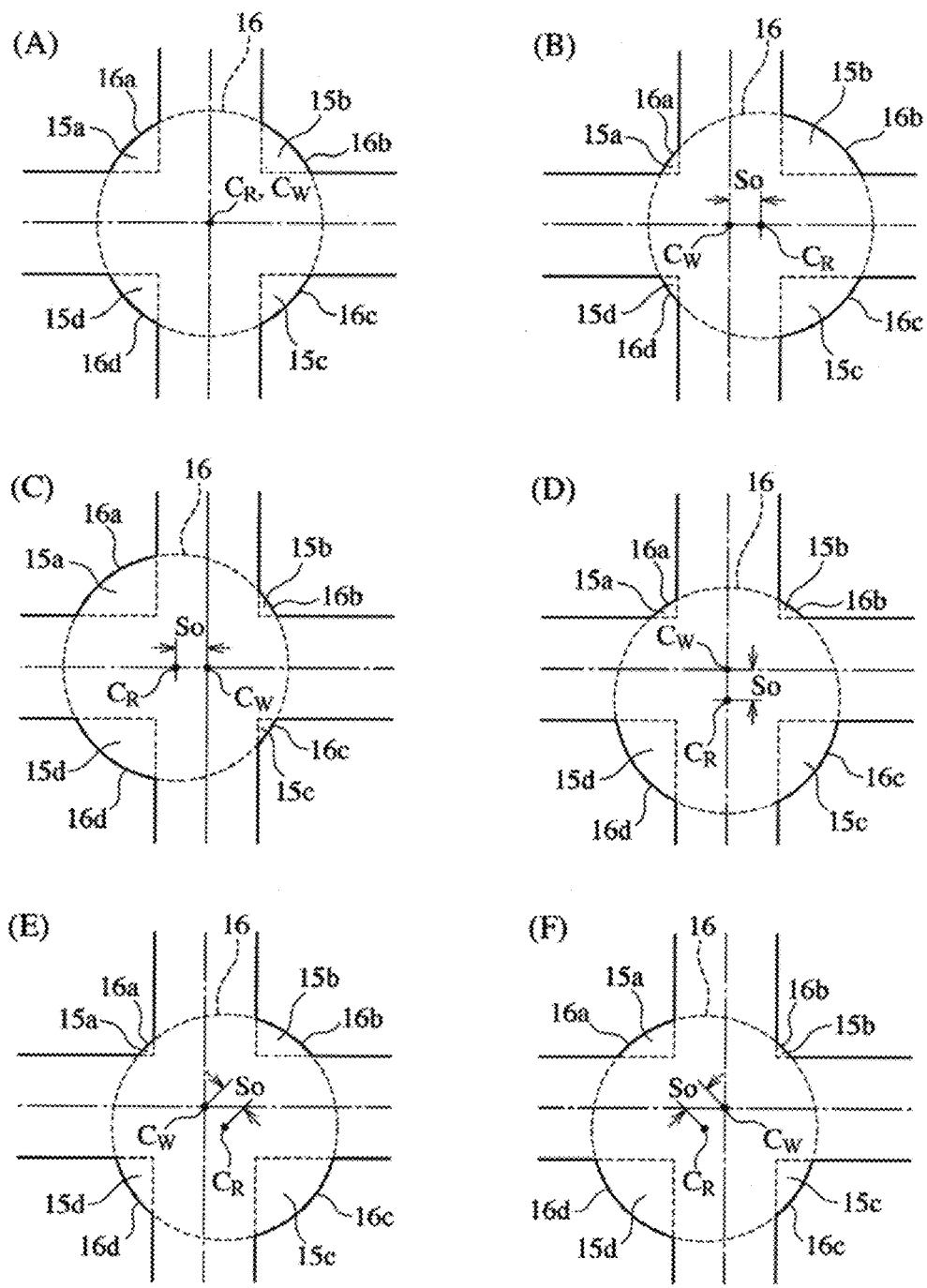
FIG. 7 is a schematic view showing the positional relations between the center points of fan-shaped bulges and the center points of cell wall intersections in the center portion (A) and the outer peripheral portions (B) to (F) in FIG. 5.

A cross section of the ceramic honeycomb structure 10 of the present invention is shown in of FIG. 5, and cell wall intersections 14 in a center portion (A) and outer peripheral portions (B) to (F) in FIG. 5 are enlargedly shown in FIGS. 6 (A) to 6 (F), respectively. At each cell wall intersection 14 in the center portion (A) and the outer peripheral portions (B) to (F) shown in FIG. 5, the center point distance S between the center point $C_R$ of the circumscribed circles 16 of the circular portions 16a, 16b, 16c, 16d of the fan-shaped bulges 15a, 15b, 15c, 15d and the center point $C_W$ of the cell wall intersection 14, and its direction are shown in FIGS. 7, (A) to 7 (F). As shown in FIG. 7 (A), in the center portion (A) of the ceramic honeycomb structure 10, the center point $C_R$ of the circumscribed circle 16 is preferably positioned at the center point $C_W$ of the cell wall intersection 14.

In the center portion (A) of the ceramic honeycomb structure 10, however, the center point $C_R$ of the circumscribed circle 16 is actually not in complete accordance with the center point $C_W$ of the cell wall intersection 14, because their positions are variable depending on the production conditions, etc. of the ceramic honeycomb structure 10. Accordingly, the center point distance $S_C$ between the center point $C_R$ of the circumscribed circle 16 and the center point $C_W$ of the cell wall intersection 14 in the center portion (A) is expressed by an average of values measured at five cell wall intersections in total including a cell wall intersection closest to the center of the ceramic honeycomb structure 10, and four cell wall intersections adjacent to the closest cell wall intersection.

In the present invention, the center point distance So in the outer peripheral portion [for example, average in four outer peripheral portions (C), (D), (E) and (F)] is larger than the center point distance Sc in the center portion (A), namely Sc<So.

In the honeycomb structure shown in FIG. 5, for example, the outer peripheral portions (C) and (D) in the direction of 90° and the outer peripheral portions (E) and (F) in the direction of 45° are selected to explain a method for determining a center point distance So. First, center point distances S at three cell wall intersections in total, including a cell wall intersection in the outer peripheral portion (C) and two cell wall intersections (C2) and (C3) adjacent thereto, are measured and averaged. At cell wall intersections in the outer peripheral portions (D), (E) and (F), too, center point distances at three cell wall intersections in total, including one selected cell wall intersection and two cell wall intersections [(D2) and (D3), (E2) and (E3), and (F2) and (F3), respectively] adjacent thereto in each outer peripheral portion, are similarly measured and averaged. Average center point distances in these four outer peripheral portions (C), (D), (E) and (F) are further averaged to obtain the center point distance So.

In the outer peripheral portion, the center point $C_R$ of the circumscribed circle 16 is preferably separate from the center point $C_W$ of the cell wall intersection 14 toward the outer peripheral wall 11 of the ceramic honeycomb structure 10 by the center point distance So. The term "toward the outer peripheral wall 11" means toward an outer peripheral wall 11 closest to the cell wall intersection 14, namely, on the opposite side to the center axis of the ceramic honeycomb structure.

It is preferable that the fan-shaped bulges 15a, 15b, 15c, 15d are formed substantially uniformly in four flow paths in the center portion (A) as shown in FIG. 7 (A), while in the outer peripheral portion (C) in the direction of 90°, the fan-shaped bulges 15a, 15d formed on the side of the outer peripheral wall 11 (left side in the figure) have larger areas than those of the fan-shaped bulges 15b, 15c formed on the side of the center axis of the ceramic honeycomb structure 10 (right side in the figure) as shown in FIG. 7 (C).

Likewise, in the outer peripheral portion (B) in the direction of 90°, as shown in FIG. 7 (B), the fan-shaped bulges 15b, 15c formed on the side of the outer peripheral wall 11 (right side in the figure) preferably have larger areas than those of the fan-shaped bulges 15a, 15d formed on the center side (left side in the figure).

Further, in the outer peripheral portion (D) in the direction of 90°, as shown in FIG. 7 (D), the fan-shaped bulges 15c, 15d formed on the side of the outer peripheral wall 11 (lower side in the figure) preferably have larger areas than those of the fan-shaped bulges 15a, 15b formed on the center side (upper side in the figure).

Further, in the outer peripheral portion (E) in the direction of 45° from the center axis of the ceramic honeycomb structure, as shown in FIG. 7 (E), the fan-shaped bulge 15c formed on the side of the outer peripheral wall 11 (lower right side in the figure) preferably has a larger area than that of the fan-shaped bulge 15a formed on the center side (upper left side in the figure), with the fan-shaped bulges 15b, 15d formed on the upper right and lower left sides of the cell wall intersection 14 having intermediate areas of them.

Likewise, in the outer peripheral portion (F) in the direction of 45° from the center axis of the ceramic honeycomb structure, as shown in FIG. 7 (F), the fan-shaped bulge 15d formed on the side of the outer peripheral wall 11 (lower left side in the figure) has a larger area than that of the fan-shaped bulge 15b formed on the center side (upper right side in the figure), with the fan-shaped bulges 15a, 15c formed on the upper left and lower right sides of the cell wall intersection 14 having intermediate areas of them.

Thus, with the center point distance So in the outer peripheral portion of the ceramic honeycomb structure and the center point distance Sc in the center portion meeting Sc<So, and the center point $C_R$ of the circumscribed circle 16 being separate from the center point $C_W$ of the cell wall intersection 14, toward the outer peripheral wall 11 from the center axis of the ceramic honeycomb structure 10 by the center point distance So in the outer peripheral portion, the extrusion-molded ceramic honeycomb green body and the ceramic honeycomb sintered body obtained by drying and sintering the ceramic honeycomb green body are reinforced by the fan-shaped bulges 15a, 15b, 15c, 15d formed with different areas at the cell wall intersections 14 in the outer peripheral portion, having higher resistance to cracking. Also, even if cracks were generated, they would not propagate into the ceramic honeycomb structure 10. Among the fan-shaped bulges 15a, 15b, 15c, 15d formed with different areas at cell wall intersections 14 in the outer peripheral portion, those having large areas presumably contribute to reinforcement. Particularly when receiving shock from a surrounding surface, the fan-shaped bulges formed with larger areas on the side of the outer peripheral wall 11 can well reinforce the cell wall intersections 14. Thus, the outer peripheral portion preferably has higher mechanical strength than in a ceramic honeycomb structure in which the center point distance So in an outer peripheral portion is the same as the center point distance Sc in a center portion. Further, because the total area of fan-shaped bulges 15a, 15b, 15c, 15d does not substantially differ between the center and outer peripheral portions of the ceramic honeycomb structure, the center and outer peripheral portions have substantially the same opening ratio, desirably avoiding pressure loss increase as compared with a ceramic honeycomb structure in which the center point distance So in an outer peripheral portion is the same as the center point distance Sc in a center portion.

In the present invention, the center point distance Sc in the center portion (A) is preferably 20 µm or less. Further, the center point distance S between the center point $C_R$ of the circumscribed circle 16 and the center point $C_W$ of the cell wall intersection 14 preferably increases as the cell wall intersection 14 becomes distant from the center of the ceramic honeycomb structure 10. In this case, the difference between the center point distance Sc in the center portion of the ceramic honeycomb structure 10 and the center point distance So in the outer peripheral portion is preferably 5-150 µm. The difference between Sc and So is preferably 10-120 µm, and further preferably 10-100 µm. With such center point distance Sc and such difference between Sc and So, the cell wall intersections are well reinforced, so that cracks received from the side of the outer peripheral wall 11, if any, would not easily propagate inside.

At a position of X (mm) from the axis center of the ceramic honeycomb structure 10, the center point distance S (µm) is further preferably expressed by $S=F_1 \times X + M_1$, wherein $F_1$ is a constant of 0.05-0.4, and $M_1$ is a constant of 0-20. Because $M_1$ represents the center point distance Sc in the center portion, the difference between the center point distance Sc in the center portion and the center point distance So in the outer peripheral portion is expressed by the formula of $So-Sc=F_1 \times \Delta X$, wherein $\Delta X$ is the distance (mm) from the axis center to the outer peripheral portion.

In an intermediate portion between the center and outer peripheral portions of the ceramic honeycomb structure, a center point distance Sh at a cell wall intersection preferably meets Sc<Sh<So. The intermediate portion is as distant from the center portion of the ceramic honeycomb structure as about half of the distance between the center portion and the outer peripheral portion. The center point distance Sh is a value obtained by selecting four cell wall intersections (two in the directions of 90° and two in the directions of 45°) in the intermediate portion, defining four groups each having three cell wall intersections in total including one selected cell wall intersection [for example, (G) or (H) in FIG. 5] and two adjacent cell wall intersections [(G2) and (G3), or (H2) and (H3)], obtaining an average of center point distances S in each group, and averaging them over the four groups. The shapes of fan-shaped bulges 15a, 15b, 15c, 15d at cell wall intersections 14 in the center portion (A), intermediate portions (G) and (H) (middle portions between the center portion and the outer peripheral portion), and outer peripheral portions (B) and (C) of the ceramic honeycomb structure in FIG. 5 are shown in FIGS. 6 (A), 6 (G), 6 (H), 6 (B) and 6 (C), respectively.

For example, among fan-shaped bulges 15a, 15b, 15c, 15d formed at cell wall intersections 14 in the center portion (A), intermediate portion (H) and outer peripheral portion (C) of the ceramic honeycomb structure, the areas of the fan-shaped bulges 15a, 15d formed on the side of the outer peripheral wall 11 close to the outer peripheral portion (C) (left side in the figure) get larger as their positions shift from the center portion (A) to the intermediate portion (H) and the outer peripheral portion (C) in this order, while the areas of the fan-shaped bulges 15b, 15c formed on the opposite side (right side in the figure) get smaller in this order.

Likewise, in the center portion (A), intermediate portion (G) and outer peripheral portion (B) of the ceramic honeycomb structure, too, the areas of fan-shaped bulges 15b, 15c formed on the side of the outer peripheral wall 11 close to the outer peripheral portion (B) (right side in the figure) get larger as their positions shift from the center portion (A) to the intermediate portion (G) and the outer peripheral portion (B) in this order, while the areas of fan-shaped bulges 15a, 15d formed on the opposite side (left side in the figure) get smaller in this order.

Such structure reinforces fan-shaped bulges closer to the outer peripheral wall 11 in the outer peripheral and intermediate portions than a ceramic honeycomb structure in which the center point distance So in an outer peripheral portion is the same as the center point distance Sc in a center portion, resulting in less cracking and higher mechanical strength.

The radius of the circumscribed circle 16 is preferably 0.75-1.25 times, more preferably 0.8-1.1 times, the thickness of the cell walls of the ceramic honeycomb structure 10. The radius of the circumscribed circle 16 is preferably 230-380 µm, and more preferably 240-330 µm, though variable depending on the thickness of the cell walls.

The ceramic honeycomb structure of the present invention preferably has an average cell wall thickness of 4-15 mil (0.102-0.381 mm), and an average cell density of 150-300 cpsi (23.3-46.5 cells/cm$^2$). With such cell wall structure, even large and/or thin-wall ceramic honeycomb structures can have sufficient mechanical strength. The average cell wall thickness of less than 4 mil provides the cell walls with low strength, while the average cell wall thickness of more than 15 mil makes it difficult to keep low pressure loss in an early period of use. The average cell density of less than 150 cpsi provides the cell walls with low strength, while the average cell density of more than 300 cpsi makes it difficult to keep low pressure loss.

Because ceramic honeycomb structures are used for cleaning exhaust gases discharged from diesel engines, materials for cell walls of the ceramic honeycomb structure of the present invention are preferably heat-resistant ceramics, namely, ceramics comprising alumina, mullite, cordierite, silicon carbide, silicon nitride, zirconia, aluminum titanate, lithium aluminum silicate, etc. as main crystals. Preferable among them are ceramics comprising low-thermal-expansion cordierite having excellent heat shock resistance as a main crystal.

[2] Production Method of Ceramic Honeycomb Structure

A method for producing the ceramic honeycomb structure of the present invention comprises the steps of (a) extrusion-molding a moldable material containing ceramic materials to a predetermined green body comprising an outer peripheral portion integral with cell walls, and (b) drying and sintering the green body to obtain a sintered body;

the above extrusion molding step using a honeycomb-molding die comprising supply holes for supplying the moldable material, and lattice-shaped slits for molding the moldable material to a honeycomb shape, which are formed on the opposite surface side to a surface side having the supply holes, with communication with the supply holes;

each of four corners of a die member having a circular recess at each slit intersection at which the lattice-shaped slits are crossing, when viewed in the extrusion direction;

the inscribed circles of the four circular recesses at all slit intersections having a constant radius;

when the distance between the center point of the inscribed circle and the center point of the slit intersection is defined as a die center point distance Sd, a die center point distance Sdc in the center portion of the honeycomb-molding die and a die center point distance Sdo in the outer peripheral portion of the honeycomb-molding die meeting Sdc<Sdo.

After the step (b) of drying and sintering the green body to obtain the sintered body, if necessary, a step (c) of coating an outer peripheral surface of the sintered body with or without removal of its outer peripheral portion by machining with a coating material and heat-treating the coating material to form an outer peripheral wall may be conducted.

A ceramic honeycomb green body obtained by extrusion-molding the moldable ceramic material by this die comprises large numbers of longitudinal flow paths formed by cell walls arranged in a lattice pattern, in a cross section perpendicular to the longitudinal direction; at least one fan-shaped bulge being projecting in a fan shape toward the flow paths from a cell wall intersection at which the cell walls are crossing; the circumscribed circles of circular portions of the fan-shaped bulges at all cell wall intersections having a constant radius; and when the distance between the center point of the circumscribed circle and the center point of the cell wall intersection is defined as a center point distance S, a center point distance So in the outer peripheral portion of the ceramic honeycomb structure and a center point distance Sc in the center portion meeting Sc<So. By drying and sintering this ceramic honeycomb green body, and forming an outer peripheral wall, the ceramic honeycomb structure of the present invention can be obtained.

(1) Ceramic Materials

Ceramic materials are preferably prepared to a cordierite-forming material. The cordierite-forming material is obtained by mixing powdery materials comprising silica sources, alumina sources and magnesia sources, such that its main crystal is cordierite having a chemical composition comprising 42-56% by mass of $SiO_2$, 30-45% by mass of $Al_2O_3$, and 12-16% by mass of MgO. Because pores formed in ceramics comprising cordierite as a main crystal are formed by the melting of the ceramic materials in the sintering process, the structure of pores formed by sintering cordierite-based ceramics can be controlled by adjusting the particle sizes and particle size distributions of ceramic materials such as kaolin, silica, talc, alumina, etc.

(2) Honeycomb-Molding Die

Figure 8A:
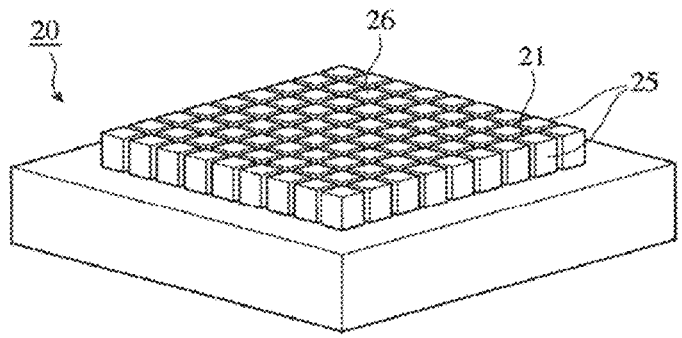
FIG. 8a is a perspective view showing an example of the honeycomb-molding dies of the present invention from the slit side.
Figure 8B:
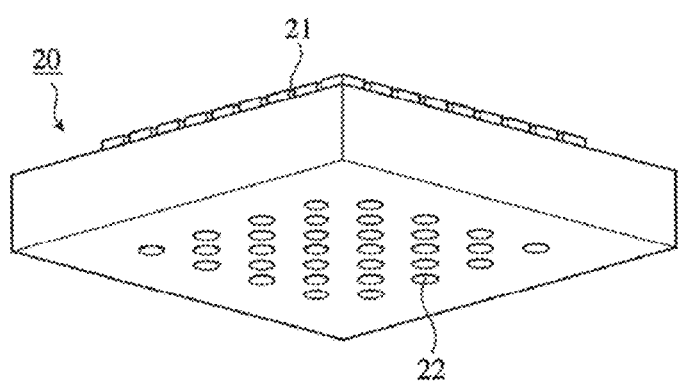
FIG. 8b is a perspective view showing an example of the honeycomb-molding dies of the present invention from the supply hole side.
Figure 9:
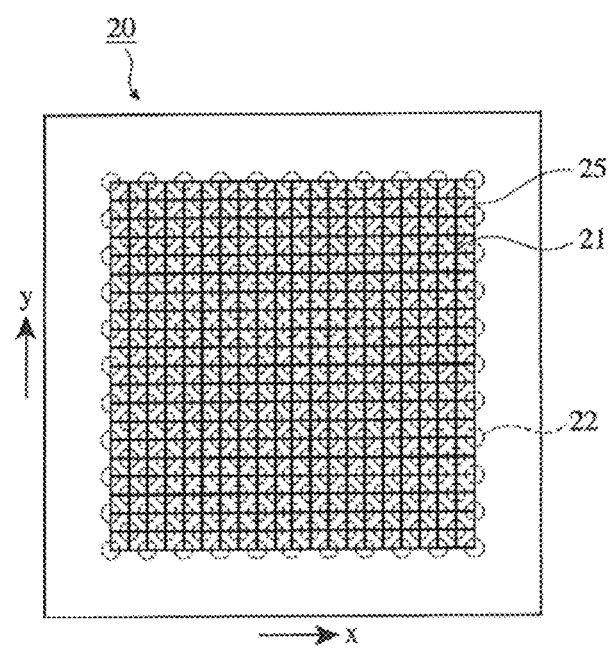
FIG. 9 is a front view showing an example of the positional relations between slits and supply holes in the honeycomb-molding die of the present invention.

As shown in FIGS. 8a and 8b, the molding die 20 comprises supply holes 22 for supplying a moldable material, and lattice-shaped slits 21 for molding the moldable material to a honeycomb shape, which are formed on the opposite surface side to a surface side on which the supply holes 22 are formed with communication with the supply holes 22. The moldable ceramic material introduced into the molding die 20 through the supply holes 22 is molded by the slits 21 to a honeycomb shape. Each quadrilateral cross section of the die member 26 encircled by the slits 21 corresponds to each cross section of the flow paths of the honeycomb structure. All supply holes 22 are communicating with all intersections of the lattice-arranged slits 21, or the supply holes 22 are communicating with the intersections of the slits 21 in a checkerboard pattern (shown in FIG. 9).

Figure 10A:
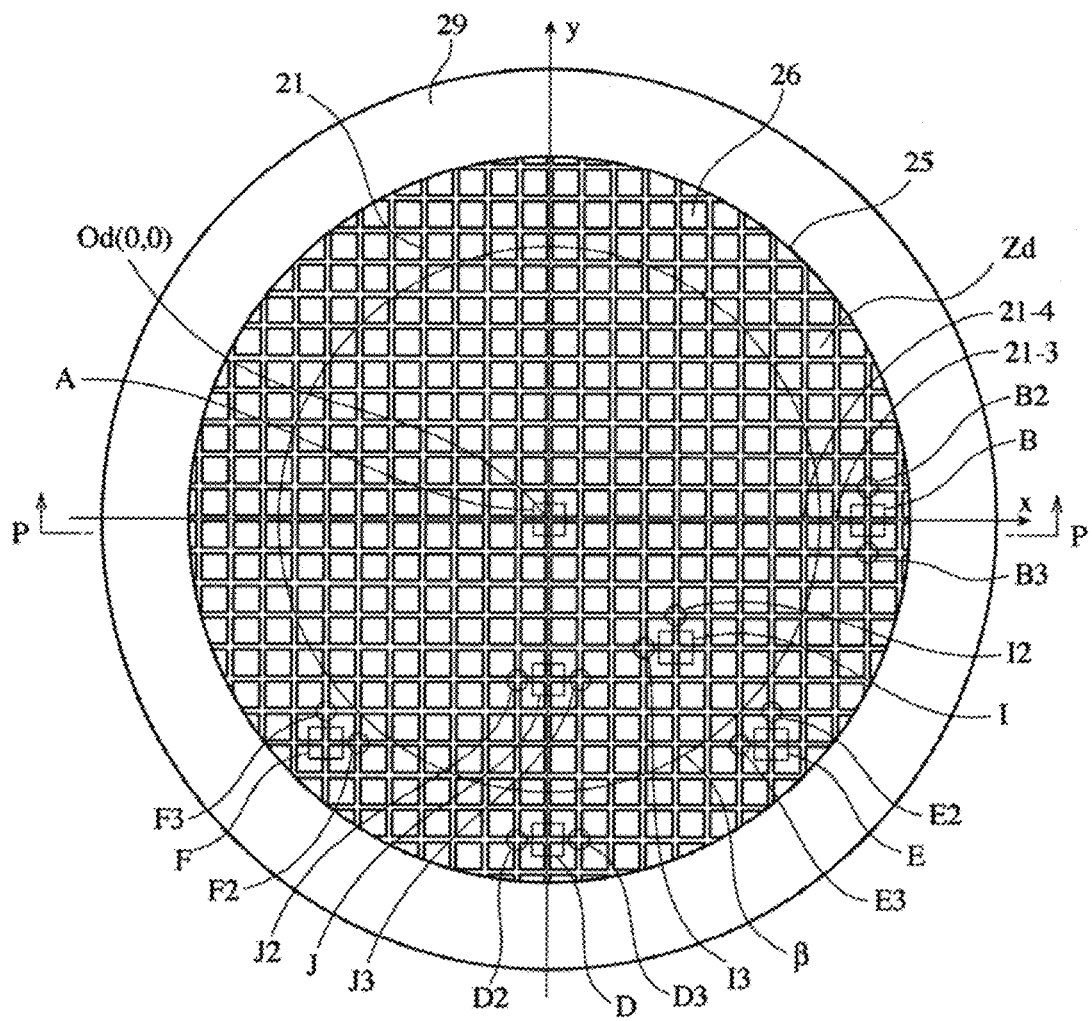
FIG. 10a is a front view showing the honeycomb-molding die of the present invention from the slit side.
Figure 10B:
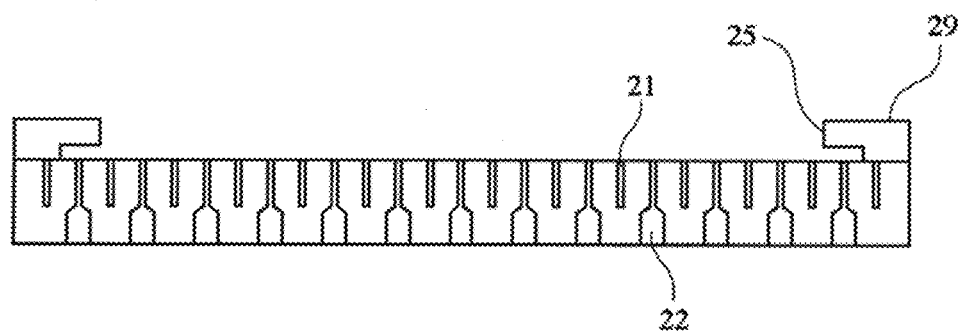
Figure 11:
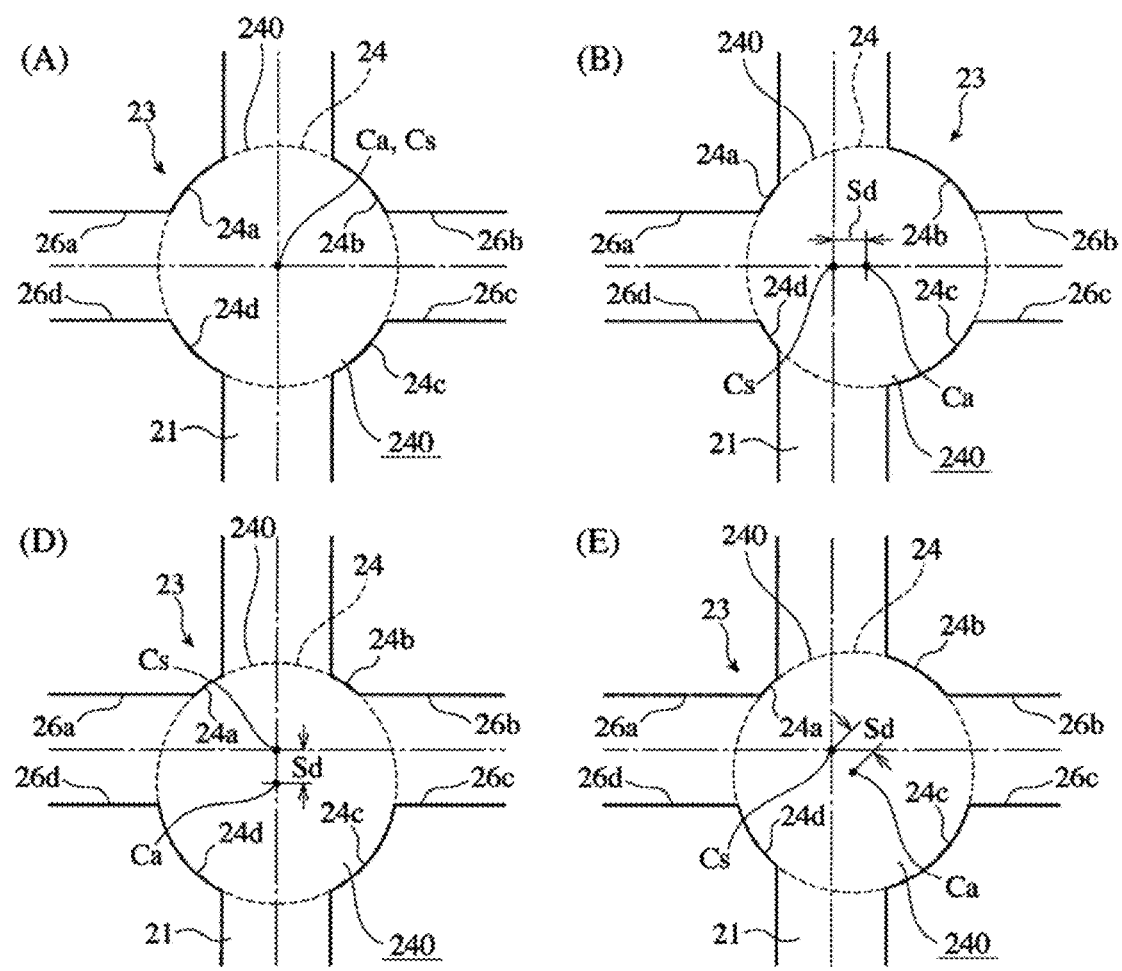

The molding die 20 of the present invention is shown in FIGS. 10a and 10b, and slit intersections at positions A, B, D and E in the molding die 20 shown in FIG. 10a are enlargedly shown in FIGS. 11 (A), (B), (D) and (E). The molding die 20 of the present invention comprises circular recesses 24a, 24b, 24c, 24d at four corners 26a, 26b, 26c, 26d of the die member positioned at a slit intersection 23 at which the lattice-shaped slits 21 are crossing, when viewed in the extrusion direction, and the inscribed circles 24 of the four circular recesses 24a, 24b, 24c, 24d at all slit intersections have a constant radius. A guide ring 29 (having a circular inner contour for a circular honeycomb structure as shown in FIG. 10a) for determining the outer diameter of the honeycomb structure and forming an outer peripheral wall is arranged on a surface having slits 21 in an outer peripheral portion of the die member 26. The inner contour of the guide ring 29 determines the outer periphery 25 of the die member 26.

When the distance between the center point Ca of the inscribed circle 24 and the center point Cs of the slit intersection 23 is defined as a die center point distance Sd, a die center point distance Sdc in the center portion of the honeycomb-molding die 20 and a die center point distance Sdo in the outer peripheral portion of the honeycomb-molding die meet Sdc<Sdo.

The die center point distance Sdc in the center portion when viewed in the extrusion direction is an average of die center point distances at five slit intersections in total, including a slit intersection closest to the center of the honeycomb-molding die, and four adjacent slit intersections. As shown in FIG. 10a, with an x-axis and an y-axis extending along the slits 21 from the center Od of the die as an origin when viewed in the extrusion direction, the outer peripheral portion is defined as a region Zd outside a circle β having a radius rd with the origin as a center, wherein rd is determined by counting third and fourth slit intersections 21-3, 21-4 on or closest to each axis from an intersection of each axis and the outer periphery 25, determining middle points (two on the x-axis, and two on the y-axis) of the third and fourth slit intersections 21-3, 21-4 on the axes to know lengths from the origin to the middle points, and averaging the lengths. The die center point distance Sdo in the outer peripheral portion is defined as a value determined by selecting four slit intersections in the outer peripheral portion, defining four groups each having three slit intersections in total including one selected slit intersection and two adjacent slit intersections, obtaining an average of die center point distances in each group, and averaging them over the four groups.

In the center portion of the honeycomb-molding die 20 (at A in FIG. 10a), as shown in FIG. 11 (A), it is preferable to design that the center point Ca of the inscribed circle 24 is positioned at the center point Cs of the slit intersection 23. However, even in such design of the honeycomb-molding die 20, the center point Ca is actually not necessarily in complete accordance with the center point Cs. Accordingly, the die center point distance Sdc in the center portion of the die (at A in FIG. 10a) is expressed by an average of values measured at five slit intersections including a slit intersection closest to the die center and four adjacent slit intersections.

At positions (B, D and E in FIG. 10a) in the outer peripheral portion of the honeycomb-molding die 20, as shown in FIGS. 11 (B), 11 (D) and 11 (E), the center point Ca of the inscribed circle 24 is separate from the center point Cs of the slit intersection 23 toward the outer periphery 25 (in radial directions from the center of the honeycomb-molding die 20). For example, at the position E, the center point Ca of the inscribed circle 24 is separate from the center point Cs of the intersection 23 toward the outer periphery 25, along a line connecting the center of the honeycomb-molding die 20 (the center point Cs of the intersection 23 at the position A) and the center point Cs of the intersection 23 at the position E.

In the outer peripheral portions (B, D, E and F in FIG. 10a) of the die, the die center point distance Sdo between the center point Ca and the center point Cs is a value obtained by selecting four slit intersections in the outer peripheral portion, defining four groups each having three slit intersections in total including one selected slit intersection and two adjacent slit intersections, determining an average of die center point distances in each group, and averaging them over the four groups. Thus, with four slit intersections selected in the outer peripheral portion, and each having three slit intersections in total including one selected slit intersection and two adjacent slit intersections, an average of die center point distances is obtained at each selected slit intersection, and the die center point distance Sdo is determined by averaging the resultant average values. The four slit intersections selected in the outer peripheral portion are two in parallel with the slits (hereinafter called "direction of 90°") and two in diagonal directions of the slit (hereinafter called "direction of 45°"), from the center of the honeycomb-molding die 20.

In the die shown in FIG. 10a, for example, outer peripheral portions B and D in the directions of 90° and outer peripheral portions E and F in the directions of 45° are selected to explain a method for determining the die center point distance Sdo. First, die center point distances are measured at three slit intersections in total including one slit intersection (B) and two adjacent slit intersections (B2 and B3) in the outer peripheral portion to determine their average value. At each of slit intersections in the outer peripheral portions D, E and F, too, die center point distances are similarly measured at three slit intersections in total including each slit intersection (D, E, F) and two adjacent slit intersections (D2 and D3, E2 and E3, and F2 and F3, respectively), and averaged. These four average values of die center point distances in the outer peripheral portions B, D, E and F are further averaged to determine the die center point distance Sdo.

In intermediate portions of the die (at I and J in FIG. 10a) between the center and outer peripheral portions of the die, the die center point distances Sdh of slit intersections preferably meet Sdc<Sdh<Sdo. In this case, the die center point distance Sdo in the outer peripheral portion of the die is preferably 1.5-3 times, more preferably 1.7-2.5 times, the die center point distance Sdc in the center portion of the die. The die center point distance Sdh in the intermediate portion of the die is preferably 1.1-2.5 times, more preferably 1.3-2.0 times, the die center point distance Sdc in the center portion of the die.

The intermediate portion of the die is separate from the center portion of the die by about half of the distance between the center and outer peripheral portions of the die. Also, the die center point distance Sdh at a slit intersection in the intermediate portion of the die is determined by selecting four slit intersections in the intermediate portion of the die, defining four groups each having three slit intersections in total including one selected slit intersection and two adjacent slit intersections, determining an average of die center point distances in each group, and averaging them over the four groups, as in the outer peripheral portion.

The center point distance Sd (μm) at a position separate from the center of the honeycomb-molding die 20 by X (mm) is further preferably expressed by $Sd=F_2 \times X+M_2$, wherein $F_2$ is a constant of 0.05-0.5, and $M_2$ is a constant of 0-30. Namely, the center point distance further preferably increases toward the outer periphery 25 in proportion to the distance from the center of the honeycomb-molding die 20.

Though the diameter of the inscribed circle 24 need only be larger than the width of the slit 21, it is preferably 1.5-2.5 times, more preferably 1.6-2.2 times, the width t of the slit 21.

Such honeycomb-molding die 20 can be produced by forming the supply holes 22, and then forming holes 240 and the slits 21 on the opposite surface side to a surface side on which the supply holes 22 are formed. In this case, the center of each hole 240 corresponds to the center point Ca of each inscribed circle 24, so that four corners of the die member at each slit intersection 23 of the honeycomb-molding die 20 are provided with circular recesses when viewed in the extrusion direction. The holes and the slits 21 are formed, such that the center of each hole 240 (corresponding to the center point Ca of each inscribed circle 24) is separate from the center point Cs of each intersection 23 by the center point distance Sd toward the outer periphery 25 from the center of the honeycomb-molding die 20. The holes 240 can be formed by drilling with position control, for example, by a precise XY-stage drilling machine.

(3) Coating Material

A coating material, which is applied if necessary to an outer peripheral surface of the sintered body with or without the removal of its outer peripheral portion by machining, preferably comprises ceramic aggregate particles and an inorganic binder as main components. In the coating material, the ceramic aggregate particles are used as aggregates, and the inorganic binder is used to bind the aggregates. By applying the coating material comprising the ceramic aggregate particles and the inorganic binder as main components to the outer peripheral surface of the ceramic honeycomb body whose outer peripheral portion is removed by machining, and heat-treating it, the resultant outer peripheral wall is well bonded to the outer peripheral surface, resulting in a ceramic honeycomb structure having good heat shock resistance with less cracking.

Because the ceramic honeycomb structure of the present invention is used for exhaust-gas-cleaning apparatuses, the ceramic aggregate particles used in the coating material are preferably made of at least one selected from the group consisting of cordierite, silica, alumina, mullite, silicon carbide, silicon nitride, and aluminum titanate, which have good heat resistance. Among them, cordierite and/or silica reduce the thermal expansion coefficient of the outer peripheral wall, providing higher heat shock resistance.

EXAMPLES

The present invention will be explained in further detail by Examples, without intention of restricting the scope of the present invention thereto.

Examples 1-3

A Die 20 shown in FIGS. 8a, 8b, 9, 10a, 10b and 11 was produced as an extrusion-molding die. The die 20 comprised supply holes 22 for supplying a moldable material, and lattice-shaped slits 21 for molding the moldable material to a honeycomb shape, which are formed on the opposite surface side to a surface side, on which the supply holes 22 were formed, with communication with the supply holes 22. Each slit intersection 23 of the slits 21 (300 μm in width and 1.58 mm in pitch) was provided with circular recesses 24a, 24b, 24c, 24d of 540 μm in diameter. In this die 20, the center point Ca of an inscribed circle 24 of the circular recesses 24a, 24b, 24c, 24d was separate from the center point Cs of the slit intersection 23 toward the outer periphery 25 from the center of the honeycomb-molding die 20 (in a radial direction from the center of the honeycomb-molding die 20), by the center point distance Sd (μm) expressed by the formula of Sd (μm)=0.14×X+17, wherein X is a radial distance (mm) from the center of the die. The inner diameter of the outer periphery 25 was 277 mm in Examples 1 and 2, and in 239 mm Example 3.

Figure 12:
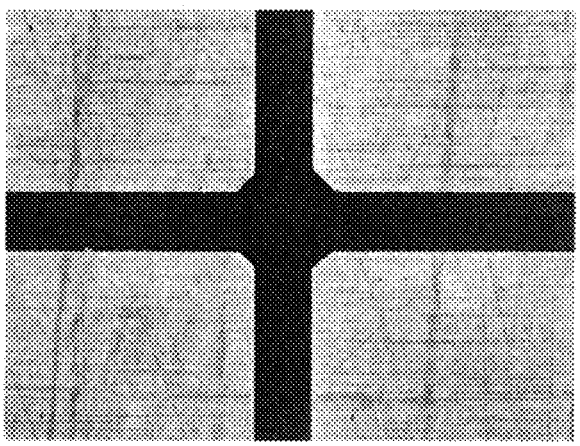
Figure 12:
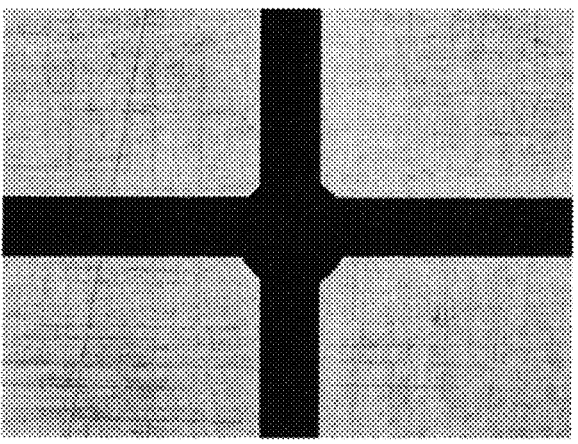
Figure 12:
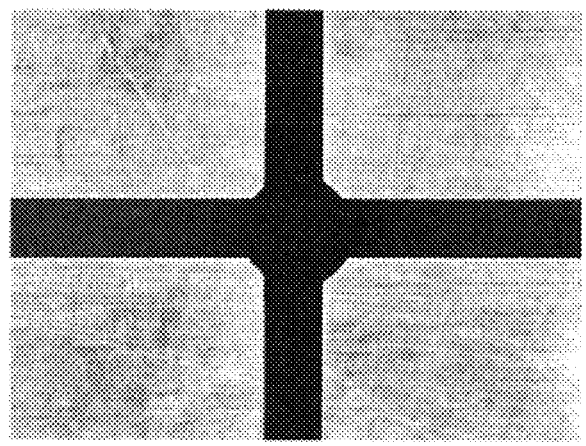
Figure 12:
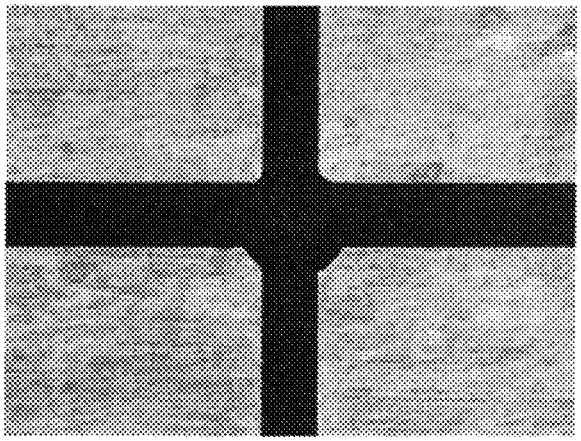
Figure 12:
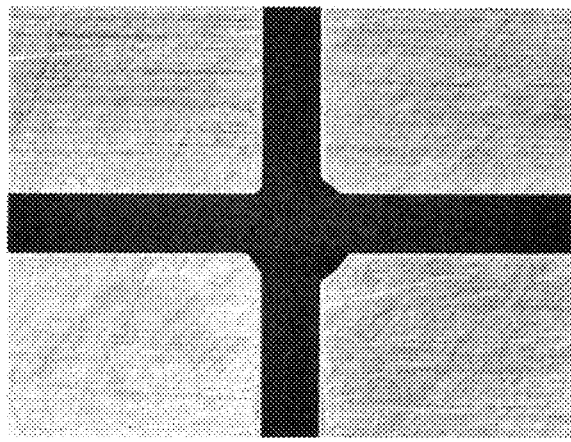

FIG. 12 is a set of photomicrographs showing slit intersections 23 in the die of Example 1. FIG. 12 (A) shows a slit intersection positioned in the center portion (at A in FIG. 10a) of the die, FIG. 12 (E) shows a slit intersection positioned in the outer peripheral portion (at E in FIG. 10a) of the die, FIG. 12 (I) shows a slit intersection positioned in the intermediate portion (at I in FIG. 10a) between the slit intersection shown in FIG. 12 (A) and the slit intersection shown in FIG. 12 (E), FIG. 12 (D) shows a slit intersection positioned in the outer peripheral portion (at D in FIG. 10a), and FIG. 12 (J) shows a slit intersection positioned in the intermediate portion (at J in FIG. 10a) between the slit intersection shown in FIG. 12 (A) and the slit intersection shown in FIG. 12 (D).

The center point distances Sd of slit intersections (between the center point Ca of the inscribed circle 24 and the center point Cs of the slit intersection 23) in the center, outer peripheral and intermediate portions of the die of Example 1 were determined by the method described below. In the center portion (A in FIG. 10a), the center point distances Sd was determined by averaging values measured at one slit intersection closest to the axis center and four adjacent slit intersections (five in total). In the outer peripheral portion, the center point distances Sd was determined by selecting four slit intersections B, D, E and F in FIG. 10a, defining four groups each having three slit intersections in total including one selected slit intersection B, D, E, F and two adjacent slit intersections (B2 and B3, D2 and D3, E2 and E3, and F2 and F3, respectively), obtaining an average of center point distances in each group, and averaging them over the four groups. In the intermediate portion, the center point distances Sd was determined by selecting four slit intersections in total including I and J in FIG. 10a and other two (not shown), defining four groups each having three slit intersections in total including one selected slit intersection and two adjacent slit intersections (I2 and I3, and J2 and J3, respectively), obtaining an average of center point distances in each group, and averaging them over the four groups. The results are shown in Table 1.

The center point distances Sd of slit intersections (between the center point Ca of the inscribed circle 24 and the center point Cs of the slit intersection 23) in the center, outer peripheral and intermediate portions of the dies of Examples 2 and 3 were determined in the same manner as in Example 1. The results are shown in Table 1.

TABLE 1

| Die Structure | Position of Slit Intersections[1] | Distance from Center (mm) | Center Point Distance Sd (μm) | D[2] (μm) | Positional Relation of Ca to Cs |
|---|---|---|---|---|---|
| Example 1 | Center Portion (A) of Die | 0.9 | 18.0 | 0.0 | — |
| | Intermediate Portion (I) in Direction of 45° | 67 | 27.0 | — | Outer Periphery Side[3] |
| | Intermediate Portion in Direction of 45° | 67 | 27.2 | — | Outer Periphery Side[3] |
| | Intermediate Portion (J) in Direction of 90° | 67 | 25.0 | — | Outer Periphery Side[3] |
| | Intermediate Portion in Direction of 90° | 67 | 24.9 | — | Outer Periphery Side[3] |
| | Average in Intermediate Portion | 67 | 26.0 | 8.0 | — |
| | Outer Peripheral Portion (E) in Direction of 45° | 133 | 36.0 | — | Outer Periphery Side[3] |
| | Outer Peripheral Portion in Direction of 45° | 133 | 36.9 | — | Outer Periphery Side[3] |
| | Outer Peripheral Portion (D) in Direction of 90° | 133 | 35.0 | — | Outer Periphery Side[3] |
| | Outer Peripheral Portion in Direction of 90° | 133 | 34.2 | — | Outer Periphery Side[3] |
| | Average in Outer Peripheral Portion | 133 | 35.5 | 17.5 | — |
| Example 2 | Center Portion (A) of die | 0.9 | 6.2 | 0.0 | — |
| | Intermediate Portion (I) in Direction of 45° | 67 | 25.3 | — | Outer Periphery Side[3] |
| | Intermediate Portion in Direction of 45° | 67 | 23.9 | — | Outer Periphery Side[3] |
| | Intermediate Portion (J) in Direction of 90° | 67 | 21.8 | — | Outer Periphery Side[3] |
| | Intermediate Portion in Direction of 90° | 67 | 25.0 | — | Outer Periphery Side[3] |
| | Average in Intermediate Portion | 67 | 24.0 | 17.8 | — |
| | Outer Peripheral Portion (E) in Direction of 45° | 133 | 38.8 | — | Outer Periphery Side[3] |

TABLE 1-continued

| Die Structure | Position of Slit Intersections[1] | Distance from Center (mm) | Center Point Distance Sd (μm) | D[2] (μm) | Positional Relation of Ca to Cs |
|---|---|---|---|---|---|
| | Outer Peripheral Portion in Direction of 45° | 133 | 32.7 | — | Outer Periphery Side[3] |
| | Outer Peripheral Portion (D) in Direction of 90° | 133 | 34.1 | — | Outer Periphery Side[3] |
| | Outer Peripheral Portion in Direction of 90° | 133 | 32.1 | — | Outer Periphery Side[3] |
| | Average in Outer Peripheral Portion | 133 | 34.4 | 28.2 | — |
| Example 3 | Center Portion (A) of Die | 0.9 | 5.4 | 0.0 | — |
| | Intermediate Portion (I) in Direction of 45° | 56 | 21.2 | — | Outer Periphery Side[3] |
| | Intermediate Portion in Direction of 45° | 56 | 19.6 | — | Outer Periphery Side[3] |
| | Intermediate Portion (J) in Direction of 90° | 56 | 17.7 | — | Outer Periphery Side[3] |
| | Intermediate Portion in Direction of 90° | 56 | 17.0 | — | Outer Periphery Side[3] |
| | Average in Intermediate Portion | 56 | 18.9 | 13.5 | — |
| | Outer Peripheral Portion (E) in Direction of 45° | 110 | 26.6 | — | Outer Periphery Side[3] |
| | Outer Peripheral Portion in Direction of 45° | 110 | 27.8 | — | Outer Periphery Side[3] |
| | Outer Peripheral Portion (D) in Direction of 90° | 110 | 22.9 | — | Outer Periphery Side[3] |
| | Outer Peripheral Portion in Direction of 90° | 110 | 27.2 | — | Outer Periphery Side[3] |
| | Average in Outer Peripheral Portion | 110 | 26.1 | 20.7 | — |

Note:
[1]The Symbols (A), (D), (E), (I) and (J) express the positions of slit intersections in FIG. 10a, and those without symbols are not shown in FIG. 10a.
Note:
[2]D represents the difference determined by subtracting the center point distance Sd in the center portion of the die from an average of center point distances Sd in various portions.
Note:
[3]The center point Ca of the inscribed circle was deviated from the center point Cs of the slit intersection toward the outer periphery.

Kaolin powder, talc powder, silica powder and alumina powder were mixed to provide a cordierite-forming material powder comprising 50% by mass of $SiO_2$, 36% by mass of $Al_2O_3$ and 14% by mass of MgO, which was sufficiently dry-mixed with methylcellulose and hydroxypropyl methylcellulose as a binder, a lubricant, and foamed resin balloons as a pore-forming material, and then sufficiently blended with a predetermined amount of water to prepare a plasticized moldable ceramic material.

The moldable ceramic material was extrusion-molded by the above die, and cut to a predetermined length to obtain a ceramic honeycomb green body. This green body was dried, and then sintered at 1410° C. to obtain a cordierite-based ceramic honeycomb sintered body. After removing an outer peripheral portion from this ceramic honeycomb sintered body by machining, an exposed outer peripheral surface of the ceramic honeycomb body was coated with an outer peripheral wall material comprising amorphous silica, colloidal silica and water, and then dried to produce a cordierite-based ceramic honeycomb structure (outer diameter: 266.7 mm, length: 304.8 mm, cell wall thickness: 0.3 mm, cell pitch: 1.58 mm, and cell wall porosity: 61% in Examples 1 and 2, and outer diameter: 228.6 mm, length: 254 mm, cell wall thickness: 0.3 mm, cell pitch: 1.58 mm, and cell wall porosity: 61% in Example 3).

Figure 13A:
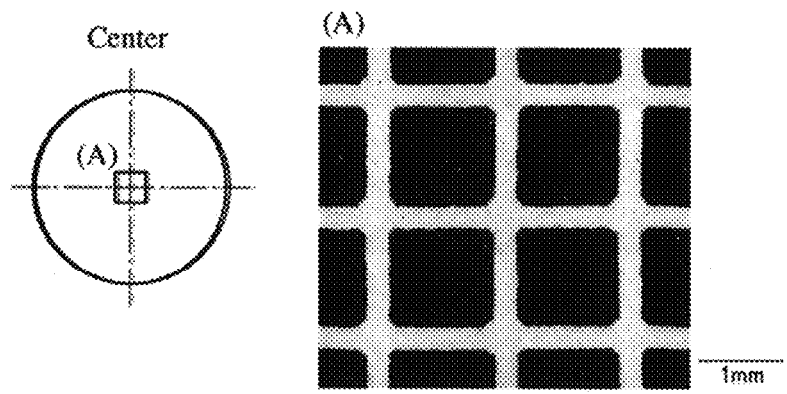
FIG. 13a is a combination of a schematic view showing the center portion (A), and a photomicrograph of cell wall intersections in that portion, in a cross section of the ceramic honeycomb structure produced in Example 1.
Figure 13B:
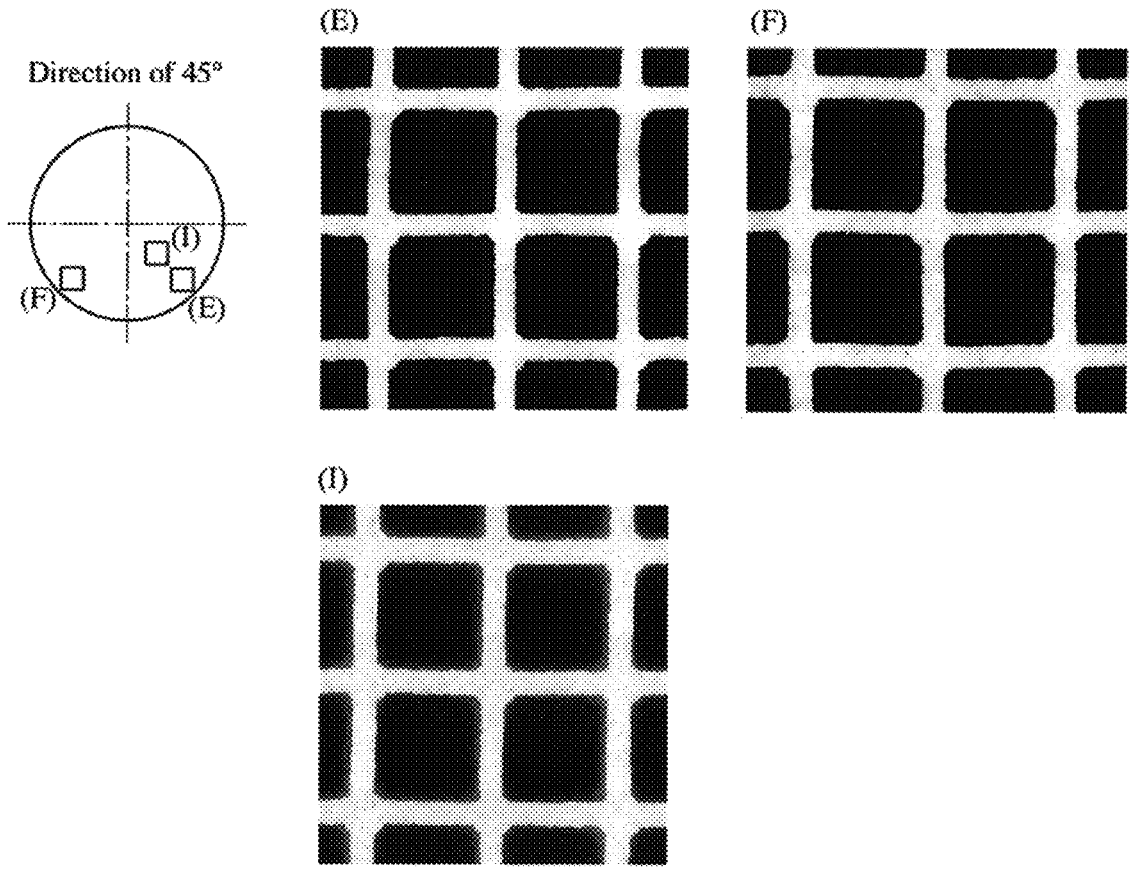
FIG. 13b is a combination of a schematic view showing outer peripheral portions (E) and (F) (in directions of 45°) and an intermediate portion (I) (in a direction of 45°), and photomicrographs of cell wall intersections in those portions, in a cross section of the ceramic honeycomb structure produced in Example 1.
Figure 13C:
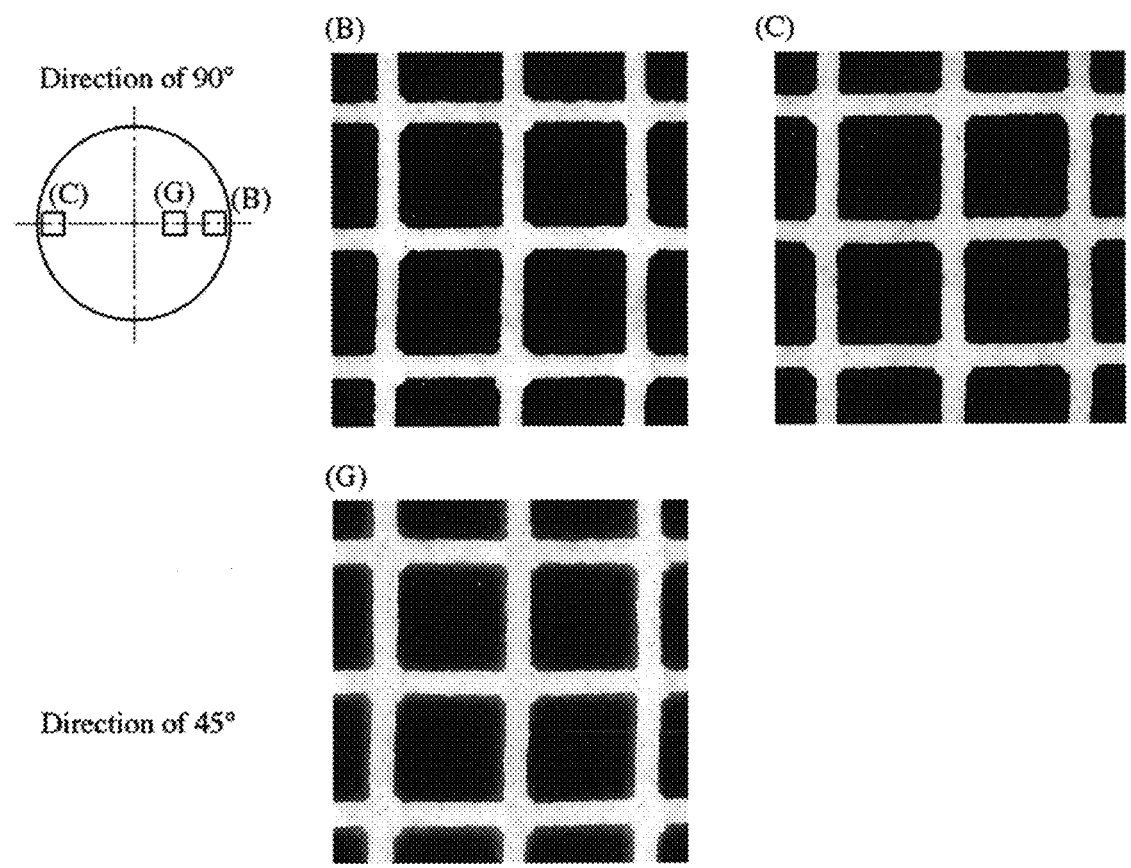
FIG. 13c is a combination of a schematic view showing outer peripheral portions (B) and (C) (in a direction of 90°) and an intermediate portion (G) (in a direction of 90°), and photomicrographs of cell wall intersections in those portions, in a cross section of the ceramic honeycomb structure produced in Example 1.

FIGS. 13a, 13b and 13c show the optical microscopic observation results of a cross section of the ceramic honeycomb structure of Example 1 perpendicular to the longitudinal direction. FIG. 13a shows cell wall intersections at the position (A) in the center portion. FIG. 13b shows cell wall intersections at the position (I) 67 mm distant from the center axis in the intermediate portion, and at the positions (E) and (F) 133 mm distant from the center axis in the outer peripheral portion, in directions from the center axis to cell wall intersections (directions of 45°). FIG. 13c shows cell wall intersections at the position (G) 67 mm distant from the center axis in the intermediate portion, and at the positions (B) and (C) 133 mm distant from the center axis in the outer peripheral portion, in directions along the cell wall from the center axis (directions of 90°). These results indicate that the cell wall intersections of the ceramic honeycomb structure of Example 1 have fan-shaped bulges projecting in a fan shape toward the flow paths.

The circumscribed circles of circular portions of fan-shaped bulges were measured on the optical photomicrographs of these cell wall intersections by an image analyzer (Quick Vision available from Mitutoyo Corporation), to determine their radii, the center point distance S between the center point $C_R$ of each circumscribed circle and the center point $C_W$ of each cell wall intersection, their positional relations, and ratios of the radius of the circumscribed circle to the cell wall thickness. The center point distance in the center portion was expressed by an average value of center point distances in five cell wall intersections in total including one cell wall intersection near the center and four adjacent cell wall intersections, and each of the center point distances in the outer peripheral and intermediate portions was expressed by a value determined by selecting four cell wall intersections in total at two positions in the directions of 90° and two positions in the directions of 45°, defining four groups each having three cell wall intersections in total including one selected cell wall intersection and two adjacent cell wall intersections (B2 and B3, C2 and C3, D2 and D3, E2 and E3, F2 and F3, H2 and H3, and G2 and G3), determining an average of center point distances S in each group, and averaging them over the selected four groups. The results are shown in Table 2.

TABLE 2

| No. | Position of Cell Wall Intersections[1] | Distance from Center Axis (mm) | Center Point Distance S (μm) | D[2] (μm) | Positional Relation of $C_R$ to $C_W$ |
|---|---|---|---|---|---|
| Example 1 | Center Portion (A) | 0.9 | 12.9 | 0 | — |
| | Intermediate Portion (I) in Direction of 45° | 67 | 25.3 | — | Outer Peripheral Wall Side[3] |
| | Intermediate Portion in Direction of 45° | 67 | 34.5 | — | Outer Peripheral Wall Side[3] |
| | Intermediate Portion (G) in Direction of 90° | 67 | 21.7 | — | Outer Peripheral Wall Side[3] |
| | Intermediate Portion in Direction of 90° | 67 | 26.2 | — | Outer Peripheral Wall Side[3] |
| | Average in Intermediate Portion | 67 | 26.9 | 14.0 | — |
| | Outer Peripheral Portion (E) in Direction of 45° | 133 | 44.7 | — | Outer Peripheral Wall Side[3] |
| | Outer Peripheral Portion (F) in Direction of 45° | 133 | 41.5 | — | Outer Peripheral Wall Side[3] |
| | Outer Peripheral Portion (B) in Direction of 90° | 133 | 38.7 | — | Outer Peripheral Wall Side[3] |
| | Outer Peripheral Portion (C) in Direction of 90° | 133 | 39.2 | — | Outer Peripheral Wall Side[3] |
| | Average in Outer Peripheral Portion | 133 | 41.0 | 28.1 | — |

| No. | Position of Cell Wall Intersections[1] | Radius of Circumscribed Circle (μm) | Radius of Circumscribed Circle/Cell Wall Thickness |
|---|---|---|---|
| Example 1 | Center Portion (A) | 268 | 0.89 |
| | Intermediate Portion (I) in Direction of 45° | 269 | 0.90 |
| | Intermediate Portion in Direction of 45° | 265 | 0.88 |
| | Intermediate Portion (G) in Direction of 90° | 266 | 0.89 |
| | Intermediate Portion in Direction of 90° | 263 | 0.88 |
| | Outer Peripheral Portion (E) in Direction of 45° | 266 | 0.89 |
| | Outer Peripheral Portion (F) in Direction of 45° | 263 | 0.88 |
| | Outer Peripheral Portion (B) in Direction of 90° | 265 | 0.88 |
| | Outer Peripheral Portion (C) in Direction of 90° | 269 | 0.90 |

| No. | Position of Cell Wall Intersections[1] | Distance from Center Axis (mm) | Center Point Distance S (μm) | D[2] (μm) | Positional Relation of $C_R$ to $C_W$ |
|---|---|---|---|---|---|
| Example 2 | Center Portion (A) | 0.9 | 6.0 | 0 | — |
| | Intermediate Portion (I) in Direction of 45° | 67 | 33.2 | — | Outer Peripheral Wall Side[3] |
| | Intermediate Portion in Direction of 45° | 67 | 29.4 | — | Outer Peripheral Wall Side[3] |
| | Intermediate Portion (G) in Direction of 90° | 67 | 25.8 | — | Outer Peripheral Wall Side[3] |
| | Intermediate Portion in Direction of 90° | 67 | 26.8 | — | Outer Peripheral Wall Side[3] |
| | Average in Intermediate Portion | 67 | 28.8 | 22.8 | — |
| | Outer Peripheral Portion (E) in Direction of 45° | 133 | 41.3 | — | Outer Peripheral Wall Side[3] |
| | Outer Peripheral Portion (F) in Direction of 45° | 133 | 36.0 | — | Outer Peripheral Wall Side[3] |
| | Outer Peripheral Portion (B) in Direction of 90° | 133 | 37.4 | — | Outer Peripheral Wall Side[3] |
| | Outer Peripheral Portion (C) in Direction of 90° | 133 | 35.8 | — | Outer Peripheral Wall Side[3] |
| | Average in Outer | 133 | 37.6 | 31.6 | — |

TABLE 2-continued

Peripheral Portion

| No. | Position of Cell Wall Intersections[1] | Radius of Circumscribed Circle (μm) | Radius of Circumscribed Circle/Cell Wall Thickness |
|---|---|---|---|
| Example 2 | Center Portion (A) | 267 | 0.89 |
| | Intermediate Portion (I) in Direction of 45° | 268 | 0.89 |
| | Intermediate Portion in Direction of 45° | 271 | 0.90 |
| | Intermediate Portion (G) in Direction of 90° | 270 | 0.90 |
| | Intermediate Portion in Direction of 90° | 266 | 0.89 |
| | Outer Peripheral Portion (E) in Direction of 45° | 265 | 0.88 |
| | Outer Peripheral Portion (F) in Direction of 45° | 271 | 0.90 |
| | Outer Peripheral Portion (B) in Direction of 90° | 267 | 0.89 |
| | Outer Peripheral Portion (C) in Direction of 90° | 268 | 0.89 |

| No. | Position of Cell Wall Intersections[1] | Distance from Center Axis (mm) | Center Point Distance S (μm) | D[2] (μm) | Positional Relation of $C_R$ to $C_W$ |
|---|---|---|---|---|---|
| Example 3 | Center Portion (A) | 0.9 | 7.6 | 0.0 | — |
| | Intermediate Portion (I) in Direction of 45° | 56 | 22.1 | — | Outer Peripheral Wall Side[3] |
| | Intermediate Portion in Direction of 45° | 56 | 21.6 | — | Outer Peripheral Wall Side[3] |
| | Intermediate Portion (G) in Direction of 90° | 56 | 16.4 | — | Outer Peripheral Wall Side[3] |
| | Intermediate Portion in Direction of 90° | 56 | 18.2 | — | Outer Peripheral Wall Side[3] |
| | Average in Intermediate Portion | 56 | 19.6 | 12.0 | — |
| | Outer Peripheral Portion (E) in Direction of 45° | 110 | 28.8 | — | Outer Peripheral Wall Side[3] |
| | Outer Peripheral Portion (F) in Direction of 45° | 110 | 32.0 | — | Outer Peripheral Wall Side[3] |
| | Outer Peripheral Portion (B) in Direction of 90° | 110 | 33.5 | — | Outer Peripheral Wall Side[3] |
| | Outer Peripheral Portion (C) in Direction of 90° | 110 | 29.9 | — | Outer Peripheral Wall Side[3] |
| | Average in Outer Peripheral Portion | 110 | 31.1 | 23.5 | — |

| No. | Position of Cell Wall Intersections[1] | Radius of Circumscribed Circle (μm) | Radius of Circumscribed Circle/Cell Wall Thickness |
|---|---|---|---|
| Example 3 | Center Portion (A) | 275 | 0.92 |
| | Intermediate Portion (I) in Direction of 45° | 260 | 0.87 |
| | Intermediate Portion in Direction of 45° | 261 | 0.87 |
| | Intermediate Portion (G) in Direction of 90° | 262 | 0.87 |
| | Intermediate Portion in Direction of 90° | 267 | 0.89 |
| | Outer Peripheral Portion (E) in Direction of 45° | 263 | 0.88 |
| | Outer Peripheral Portion (F) in Direction of 45° | 270 | 0.90 |

TABLE 2-continued

| | | |
|---|---|---|
| Outer Peripheral Portion (B) in Direction of 90° | 264 | 0.88 |
| Outer Peripheral Portion (C) in Direction of 90° | 264 | 0.88 |

Note:
[1]The Symbols (A) to (C), (E) to (G) and (I) express the positions of cell wall intersections in FIGS. 13a-13c, and those without symbols are not shown.

Note:
[2]D represents the difference determined by subtracting the center point distance S in the center portion from an average of center point distances S in various portions.

Note:
[3]The center point $C_R$ of the circumscribed circle was deviated from the center point $C_W$ of the cell wall intersection toward the outer peripheral wall.

Figure 14:
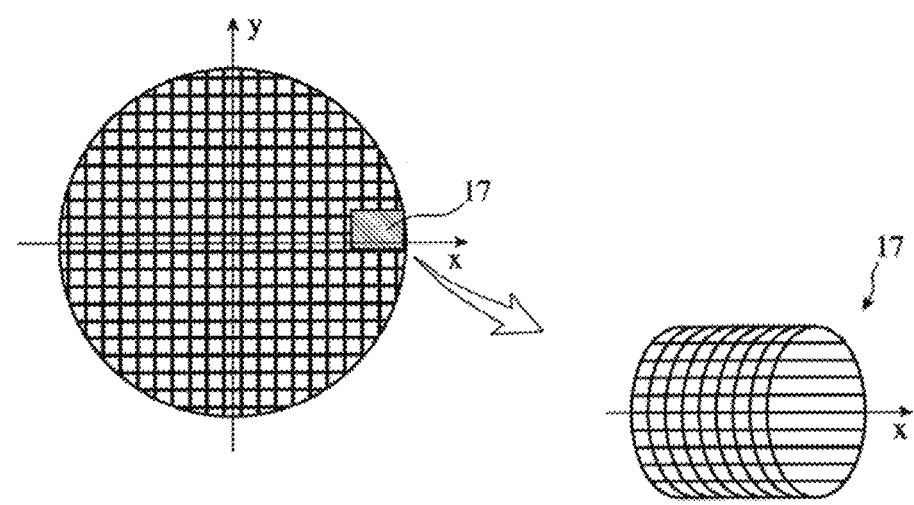
FIG. 14 is a schematic view showing the position and shape of a test piece cut out for the measurement of B-axis compressive strength.
Figure 15:
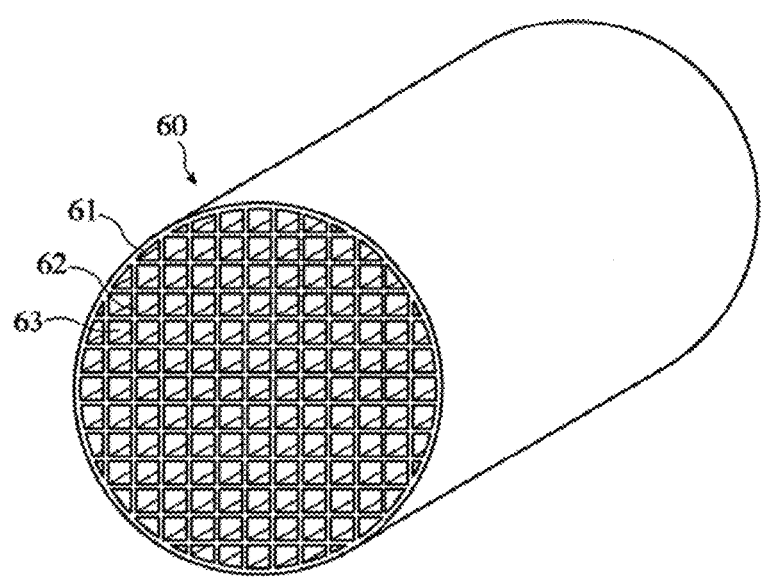
FIG. 15 is a schematic view showing an example of conventional ceramic honeycomb structures.

The ceramic honeycomb structures produced in Examples 1-3 were measured with respect to B-axis compressive failure strength. The B-axis compressive failure strength was measured on a test piece 17 of 24.5 mm in diameter and 24.5 mm in length taken out of each ceramic honeycomb structure, according to "Test Method of Ceramic Monolithic Carriers for Exhaust Gas-Cleaning Catalysts for Automobiles," M505-87 of the Society of Automobile Engineers of Japan, Inc. The test piece 17 was taken such that the x-axis or y-axis of the ceramic honeycomb structure was in alignment with a compression load direction, and that the outer peripheral portion (excluding the outer peripheral wall and the outermost incomplete flow paths) was included, as shown in FIG. 14. The measurement of B-axis compressive failure strength was conducted on three test pieces 17 taken out of each ceramic honeycomb structure, and their average was used as the B-axis compressive failure strength. The results are shown in Table 5.

Comparative Example 1

A honeycomb-molding die 20 having circular recesses 24a, 24b, 24c, 24d of 540 μm in diameter in four corners of a die member 26 at each slit intersection 23 of slits 21 (300 μm in width, and 1.58 mm in pitch) was produced, as a die for extrusion-molding a moldable ceramic material. In this die, a die center point distance Sd between the center point Ca of the inscribed circle 24 of the circular recesses 24a, 24b, 24c, 24d and the center point Cs of the slit intersection 23 was 18 μm in the center portion, 18 μm in the intermediate portion, and 17 μm in the outer peripheral portion. In the die used in Comparative Example 1, the outer periphery 25 had a diameter of 277 mm. The structure of this die is shown in Table 3.

TABLE 3

| Die Structure | Position of Slit Intersections[1] | Distance from Center (mm) | Center Point Distance Sd (μm) | D[2] (μm) | Positional Relation of Ca to Cs |
|---|---|---|---|---|---|
| Com. Ex. 1 | Center Portion of die (A) | 0.9 | 18.0 | 0.0 | — |
| | Intermediate Portion (I) in Direction of 45° | 67 | 18.0 | — | Outer Periphery Side[3] |
| | Intermediate Portion (J) in Direction of 90° | 67 | 18.0 | — | Outer Periphery Side[3] |
| | Average in Intermediate Portion | 67 | 18.0 | 0.0 | — |
| | Outer Peripheral Portion (E) in Direction of 45° | 133 | 17.0 | — | Outer Periphery Side[3] |
| | Outer Peripheral Portion (D) in Direction of 90° | 133 | 17.0 | — | Outer Periphery Side[3] |
| | Average in Outer Peripheral Portion | 133 | 17.0 | −1.0 | — |

Note:
[1]The Symbols (A), (D), (E), (I) and (J) express the positions of slit intersections in FIG. 10a.

Note:
[2]D represents the difference determined by subtracting the center point distance Sd in the center portion of the die from an average of center point distances Sd in various portions.

Note:
[3]The center point Ca of the inscribed circle was deviated from the center point Cs of the slit intersection toward the outer periphery.

The cordierite-based ceramic honeycomb structure of Comparative Example 1 having an outer diameter of 266.7 mm, a length of 304.8 mm, a cell wall thickness of 0.3 mm, a cell pitch of 1.58 mm, and a cell wall porosity of 61% was produced in the same manner as in Example 1 except for using this die. At cell wall intersections in the center, outer peripheral and intermediate portions of the cordierite-based ceramic honeycomb structure of Comparative Example 1, the circumscribed circles of circular portions of fan-shaped bulges were measured as in Example 1, to determine their radii, the center point distances S each between the center point $C_R$ of the circumscribed circle and the center point $C_W$ of the cell wall intersection, and their positional relations. The results are shown in Table 4. With respect to the center point distance S at cell wall intersections in the center, outer peripheral and intermediate portions of the cordierite-based ceramic honeycomb structure of Comparative Example 1, the center point distance Sc in the center portion of the ceramic honeycomb structure and the center point distance So in the outer peripheral portion did not meet Sc<So. The B-axis compressive failure strength of the ceramic honeycomb structure of Comparative Example 1 measured by the same method as in Example 1 is shown in Table 5.

TABLE 4

| No. | Position of Cell Wall Intersections[1] | Distance from Center Axis (mm) | Center Point Distance S (μm) | D[2] (μm) | Positional Relation of $C_R$ to $C_W$ |
|---|---|---|---|---|---|
| Com. Ex. 1 | Center Portion (A) | 0.9 | 12.9 | 0 | Outer Peripheral Wall Side[3] |
| | Intermediate Portion (I) in Direction of 45° | 67 | 12.9 | — | Outer Peripheral Wall Side[3] |
| | Intermediate Portion in Direction of 45° | 67 | 12.8 | — | Center Axis Side[4] |
| | Intermediate Portion (G) in Direction of 90° | 67 | 12.8 | — | Center Axis Side[4] |
| | Intermediate Portion in Direction of 90° | 67 | 12.9 | — | Outer Peripheral Wall Side[3] |
| | Average in Intermediate Portion | 67 | 12.9 | 0.0 | — |
| | Outer Peripheral Portion (E) in Direction of 45° | 133 | 12.4 | — | Center Axis Side[4] |
| | Outer Peripheral Portion (F) in Direction of 45° | 133 | 13.2 | — | Outer Peripheral Wall Side[3] |
| | Outer Peripheral Portion (B) in Direction of 90° | 133 | 12.3 | — | Center Axis Side[4] |
| | Outer Peripheral Portion (C) in Direction of 90° | 133 | 13.4 | — | Outer Peripheral Wall Side[3] |
| | Average in Outer Peripheral Portion | 133 | 12.8 | −0.1 | — |

| No. | Position of Cell Wall Intersections[1] | Radius of Circumscribed Circle (μm) | Radius of Circumscribed Circle/Cell Wall Thickness |
|---|---|---|---|
| Com. Ex. 1 | Center Portion (A) | 265 | 0.88 |
| | Intermediate Portion (I) in Direction of 45° | 265 | 0.88 |
| | Intermediate Portion in Direction of 45° | 265 | 0.88 |
| | Intermediate Portion (G) in Direction of 90° | 265 | 0.88 |
| | Intermediate Portion in Direction of 90° | 265 | 0.88 |
| | Outer Peripheral Portion (E) in Direction of 45° | 266 | 0.89 |
| | Outer Peripheral Portion (F) in Direction of 45° | 266 | 0.89 |
| | Outer Peripheral Portion (B) in Direction of 90° | 266 | 0.89 |
| | Outer Peripheral Portion (C) in Direction of 90° | 266 | 0.89 |

Note:
[1]The Symbols (A) to (C), (E) to (G), and (I) express the positions of cell wall intersections in FIGS. 13a-13c, and those without symbols are not shown.
Note:
[2]D represents the difference determined by subtracting the center point distance S in the center portion from an average of center point distances S in various portions.
Note:
[3]The center point $C_R$ of the circumscribed circle was deviated from the center point $C_W$ of the cell wall intersection toward the outer peripheral wall.
Note:
[4]The center point $C_R$ of the circumscribed circle was deviated from the center point $C_W$ of the cell wall intersection toward the center axis.

TABLE 5

| No. | B-axis Compressive Failure Strength (MPa) |
|---|---|
| Example 1 | 2.3 |
| Example 2 | 2.5 |
| Example 3 | 2.1 |
| Com. Ex. 1 | 1.7 |

As is clear from the above results, in the ceramic honeycomb structures of Examples 1-3 according to the present invention having fan-shaped bulges projecting in a fan shape toward flow paths from cell wall intersections at which cell walls were crossing, the center point distance So (distance between the center point of the fan-shaped bulge and the center point of the cell wall intersection) in the outer peripheral portion of the ceramic honeycomb structure was larger than the center point distance Sc in the center portion (Sc<So), and the center point distance Sh in the intermediate portion between the center and outer peripheral portions of the ceramic honeycomb structure was larger than the center point distance Sc in the center portion and smaller than the center point distance So in the outer peripheral portion (Sc<Sh<So). With such cell wall structure, the ceramic honeycomb structure produced in Examples 1-3 had high strength. On the other hand, the ceramic honeycomb structure of Comparative Example 1 had poorer strength than in the present invention.

What is claimed is:
1. A ceramic honeycomb structure comprising large numbers of flow paths longitudinally formed by cell walls arranged in a lattice pattern in cross section, and an outer peripheral wall formed around said flow paths;

at least one fan-shaped bulge projecting in a fan shape toward said flow paths from a cell wall intersection at which said cell walls are crossing, in a cross section perpendicular to the longitudinal direction;

circumscribed circles of circular portions of said fan-shaped bulges at all cell wall intersections having a constant radius; and when the distance between the center point of said circumscribed circle and the center point of said cell wall intersection is defined as a center point distance S, a center point distance So in an outer peripheral portion of said ceramic honeycomb structure and a center point distance Sc in a center portion of said ceramic honeycomb structure meeting Sc<So.

2. The ceramic honeycomb structure according to claim 1, wherein the center point of said circumscribed circle is positioned on the side of the outer peripheral wall of said ceramic honeycomb structure with respect to the center point of said cell wall intersection, in an outer peripheral portion of said ceramic honeycomb structure.

3. The ceramic honeycomb structure according to claim 1, wherein the center point distance Sc in the center portion of said ceramic honeycomb structure is 20 μm or less, and the difference between said center point distance So in the outer peripheral portion and said center point distance Sc in the center portion is 5-150 μm.

4. The ceramic honeycomb structure according to claim 1, wherein a center point distance Sh of the cell wall intersection in an intermediate portion between the center and outer peripheral portions of said ceramic honeycomb structure meets Sc<Sh<So.

5. The ceramic honeycomb structure according to claim 1, wherein the radius of said circumscribed circle is 0.75-1.25 times the cell wall thickness of said ceramic honeycomb structure.

* * * * *